(12) United States Patent
Endo et al.

(10) Patent No.: US 8,382,860 B2
(45) Date of Patent: *Feb. 26, 2013

(54) PROCESS FOR PRODUCING LITHIUM SECONDARY BATTERY

(75) Inventors: Daisuke Endo, Kyoto (JP); Miki Yasutomi, Kyoto (JP); Yoshihiro Katayama, Kyoto (JP); Toshiyuki Nukuda, Kyoto (JP)

(73) Assignee: GS Yuasa International Ltd., Kyoto-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/923,844

(22) Filed: Oct. 12, 2010

(65) Prior Publication Data

US 2011/0037440 A1    Feb. 17, 2011

Related U.S. Application Data

(63) Continuation of application No. 12/734,579, filed on May 11, 2010.

(30) Foreign Application Priority Data

Nov. 12, 2007  (JP) ................................ 2007-293777
Dec. 21, 2007  (JP) ................................ 2007-330259
Sep. 30, 2008  (JP) ................................ 2008-252085

(51) Int. Cl.
*H01M 10/00* (2006.01)
*H01M 4/13* (2010.01)
*H01M 4/58* (2010.01)
*H02J 7/04* (2006.01)
*H01M 4/82* (2006.01)

(52) U.S. Cl. .................... 29/623.1; 429/231.95; 320/162

(58) Field of Classification Search .... 429/218.1–218.2, 429/223–224, 231.3, 231.5, 231.9–231.95, 429/232; 252/182.1; 320/127; 420/900; 428/221; 502/101; 29/623.1–623.5
See application file for complete search history.

(56) References Cited

FOREIGN PATENT DOCUMENTS

| JP | H08-171935 | 7/1996 |
|---|---|---|
| JP | H09-055211 | 2/1997 |
| JP | 2002-068748 | 3/2002 |
| JP | 2002-121026 | 4/2002 |
| JP | 2003-048718 | 2/2003 |
| JP | 2004-158443 | 6/2004 |
| JP | 2005-089279 | 4/2005 |
| JP | 2005100947 A * | 4/2005 |
| JP | 2006-036620 | 2/2006 |
| JP | 2006-036621 | 2/2006 |
| WO | WO 02/086993 | 10/2002 |
| WO | WO 2004/107480 | 12/2004 |

OTHER PUBLICATIONS

Machine Translation and Abstract in English of JP 2005-100947.* chemical behavior of layered lithium manganese oxides solid solutions", Jun. 30, 2004, pp. 141-146.

Chi-Hoon Song et al., "Influence of Solvents on the Structural and Electrochemical Properties of Li [Li0.2Ni0.1Co0.2Mn0.5]O2 Prepared by a Solvothermal Reaction Method", Jan. 4, 2006, pp. A390-A395.

K.S. Park et al., "Influence of solvents on the synthesis and electrochemical properties of Li[Li1/5Ni1/10Co1/5Mn1/2]O2 for the applications in lithium-ion batteries", Oct. 11, 2006, pp. 7628-7635.

T. A. Arunkumar et al., "Factors Influencing the Irreversible Oxygen Loss and Reversible Capacity in Layered Li[Li1/3Mn2/3]O2-Li[M]O2(M-Mn0.5-yNi0.5-7Co2y and Ni1-Coy) Solid Solutions", May 22, 2007, pp. 3067-3073.

Y. Wu et al., "High Capacity, Surface-Modified Layered Li[Li(1-x)3Mn(2-x)/3Nix/3Cox/3]O2 Cathodes with Low Irreversible Capacity Loss", Mar. 2, 2006, pp. A221-A224.

Chaolun Gan et al., "Origin of the irreversible plateau (4.5 V) of Li[Li0.182Ni0.182Co0.091Mn0.545]O2 layered material", Dec. 1, 2005, pp. 1318-1322.

Yucheng Sun et al., "Preparation and electrochemical properties of LiCoO2-LiNi0.5Mn0.5O2-Li2MnO3 solid solutions with high Mn contents", Elsevier ScienceDirect, Apr. 17, 2006, pp. 5581-5586.

Chaolun Gan et al., "Origin of the irreversible plateau (4.5V) of Li[Li0.182Ni0.182Co0.091Mn0.545]O2 layered material", Elsevier ScienceDirect, Oct. 21, 2005, pp. 1318-1322.

Christopher S. Johnson et al., "Anomalous capacity and cycling stability of xLi2MnO3*(1-x)LiMO2 electrodes (M=Mn, Ni, Co) in lithium batteries at 50 degrees Celsius", Elsevier ScienceDirect, Dec. 15, 2006, pp. 787-795.

Ki Soo Park et al., "Design and analysis of triangle phase diagram for preparation of new lithium manganese oxide solid solutions with stable layered crystal structure", Elsevier ScienceDirect, May 3, 2005, pp. 281-286.

Lianqi Zhang et al., "Synthesis of (1-2x)LiNi1/2Mn1/2O2*xLi[Li1/3Mn2/3]O2*xLiCoO2 (0<x<0.5) electrode materials and comparative study on cooling rate", Elsevire ScienceDirect, Apr. 25, 2006, pp. 598-601.

Young-Sik Hong et al., "Charge/discharge behavior of Li[Ni0.20Li0.20Mn0.60]O2 and Li[Co0.20Li0.27Mn0.53]O2 cathode materials in lithium secondary batteries", Elsevier ScienceDirect, Feb. 8, 2005, pp. 1035-1042.

Lianqi Zhang et al., "Layered (1-x-yLiNi1/2Mn1/2O2*xLi[Li1/3Mn2/3]O2*yLiCoO2(0≦x=y≦0.3 and x+y=0.5) Cathode Materials", Elsevier ScienceDirect, Dec. 2, 2004, pp. A171-A178.

S.-H. Kang et al., "Synthesis and electrochemical properties of layer-structured 0.5Li(Ni0.5Mn0.5)O2-0.5Li(Li1/3Mn2/3)O2 solid mixture", Elsevier ScienceDirect, Jun. 21, 2003, pp. 533-537.

Jung-Min Kim et al., "Electrochemical properties of Li(Li(1-x)/3CoxMn(2-2x)/3)O2 (0<x<1) solid solutions prepared by poly-vinyl alcohol (PVA) method", Elsevier ScienceDirect, Sep. 28, 2006, pp. 103-108.

(Continued)

*Primary Examiner* — Raymond Alejandro
*Assistant Examiner* — Claire L Roe
(74) *Attorney, Agent, or Firm* — Manabu Kanesaka

(57) ABSTRACT

A process for producing a lithium secondary battery employs a charging method where a positive electrode upon charging has a maximum achieved potential of 4.3 V (vs. Li/Li+) or lower. The process includes charging the lithium secondary battery to reach at least a region with relatively flat fluctuation of potential appearing in a positive electrode potential region exceeding 4.3 V (vs. Li/Li$^+$) and 4.8V (vs. Li/Li$^+$) or lower. The lithium secondary battery includes an active material having a solid solution of a lithium transition metal composite oxide having an α-NaFeO$_2$ type crystal structure. The composition ratio of Li, Co, Ni, and Mn contained in the solid solution satisfies $Li_{1+1/3x}Co_{1-x-y}Ni_{y/2}Mn_{2x/3+y/2}$ (x+y≦1, 0≦y and 1−x−y=z).

10 Claims, 13 Drawing Sheets

OTHER PUBLICATIONS

Zhonghua Lu et al., "Synthesis, Structure, and Electrochemical Behavior of Li[Ni$_x$Li$_{1/3-2x/3}$Mn$_{2/3-x/3}$]O$_2$", Journal of the Electrochemical Society, 149 (6), Apr. 30, 2002, pp. A778-A791.

Yong Joon Park et al., "Synthesis and Electrochemical Characteristics of Li[Co$_x$Li$_{(1/3-x/3)}$Mn$_{(2/3-2x/3)}$]O$_2$ Compounds", Journal of the Electrochemical Society, 151 (5), Apr. 12, 2004, pp. A720-A727.

Young-Sik Hong et al., "Synthesis and Electrochemical Properties of Nanocrystalline Li[Ni$_{0.20}$Li$_{0.20}$Mn$_{0.60}$]O$_2$", Electrochemical and Solid-State Letters, 6 (8), Jun. 4, 2003, pp. A166-A169.

Yucheng Sun et al., "The preparation and electrochemical performance of solid solutions LiCoO$_2$-Li$_2$MnO$_3$ as cathode materials for lithium ion batteries", Elsevier ScienceDirect, Jan. 24, 2006, pp. 1353-1359.

Lianqi Zhang et al., "Synthesis and electrochemistry of layered 0.6LiNi$_{0.5}$Mn$_{0.5}$O$_2$*xLi$_2$MnO$_3$*yLiCoO$_2$ (x+y=0.4) cathode materials", Elsevier ScienceDirect, Jul. 14, 2004, pp. 3197-3200.

Y.-K, Sun et al., "Electrochemical performance of layered Li[Li$_{0.15}$Ni$_{0.275-x}$Mg$_x$Mn$_{0.575}$]O$_2$ cathode materials for lithium secondary batteries", Journal of Materials, Dec. 23, 2002, pp. 319-322.

Young-Sik Hong et al., "Electrochemical and Ex Situ X-Ray Study of Li(Li$_{.2}$Ni$_{0.2}$Mn$_{0.6}$)O$_2$ Cathode Material for Li Secondary Batteries", Electrochemical and Solid-State Letters, 6 (9), Jun. 30, 2003, pp. A183-A186.

K.S. Park, et al., "Effect of Li ion in transition metal sites on electrochemical behavior of layered lithium manganese oxides solid solutions", Jun. 30, 2004, Solid State Ionics, 171 (2004), pp. 141-146.

* cited by examiner $I_{(003)}/I_{(104)} = 1.10$ $I_{(003)}/I_{(104)} = 0.65$

FIG. 5
Document: *Hong et al., Solid State Ionics, 176, 1035 (2005)*
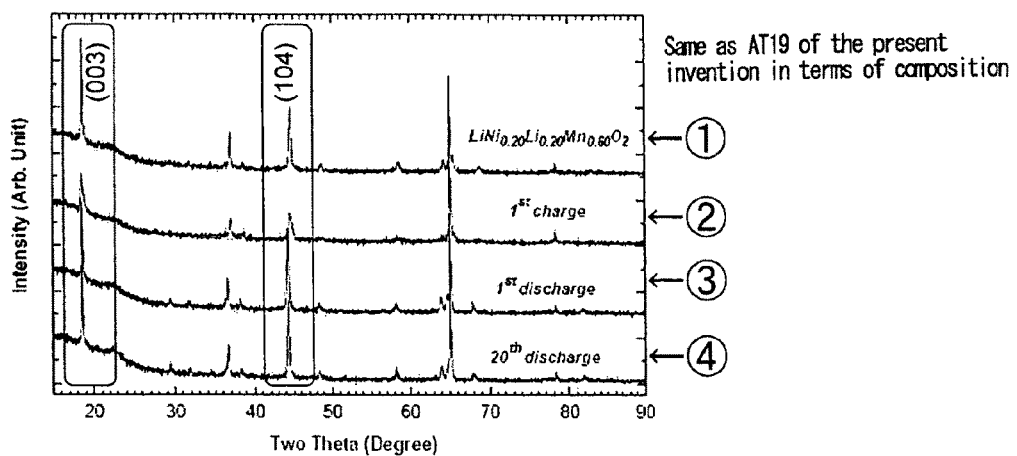
Same as AT19 of the present invention in terms of composition
Fig. 7. XRD patterns for the cycled Li[Ni₀.₂₀Li₀.₂₀Mn₀.₆₀]O₂ electrodes.
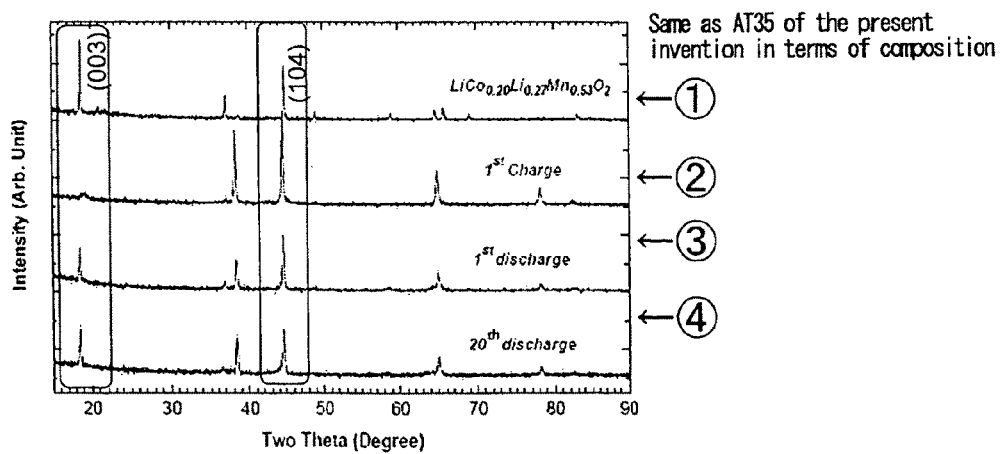
Same as AT35 of the present invention in terms of composition
Fig. 8. XRD patterns for the cycled Li[Co₀.₂₀Li₀.₂₇Mn₀.₅₃]O₂ electrodes.

FIG. 7
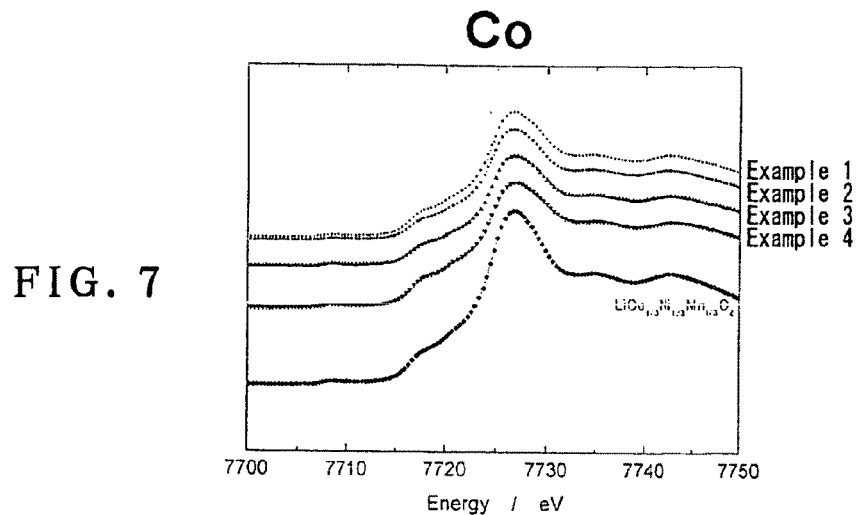
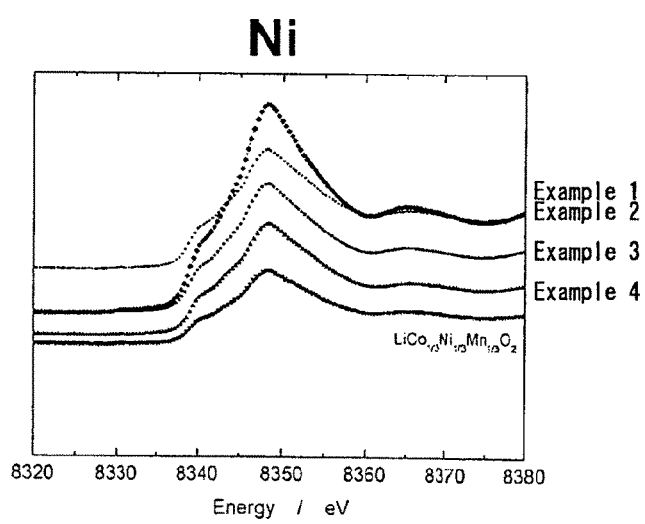
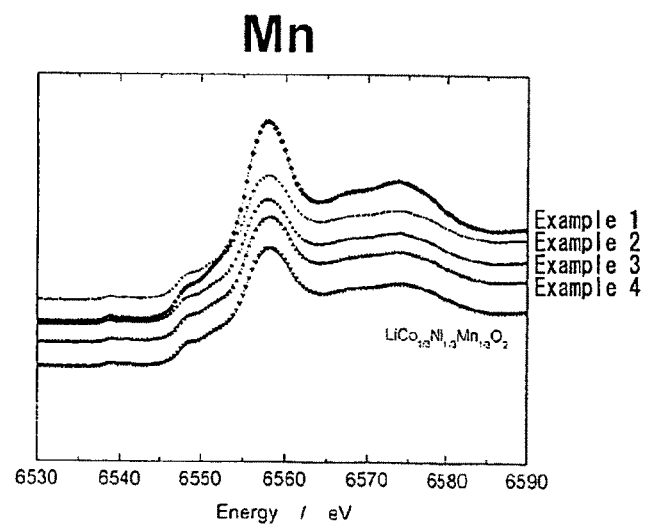

FIG. 9
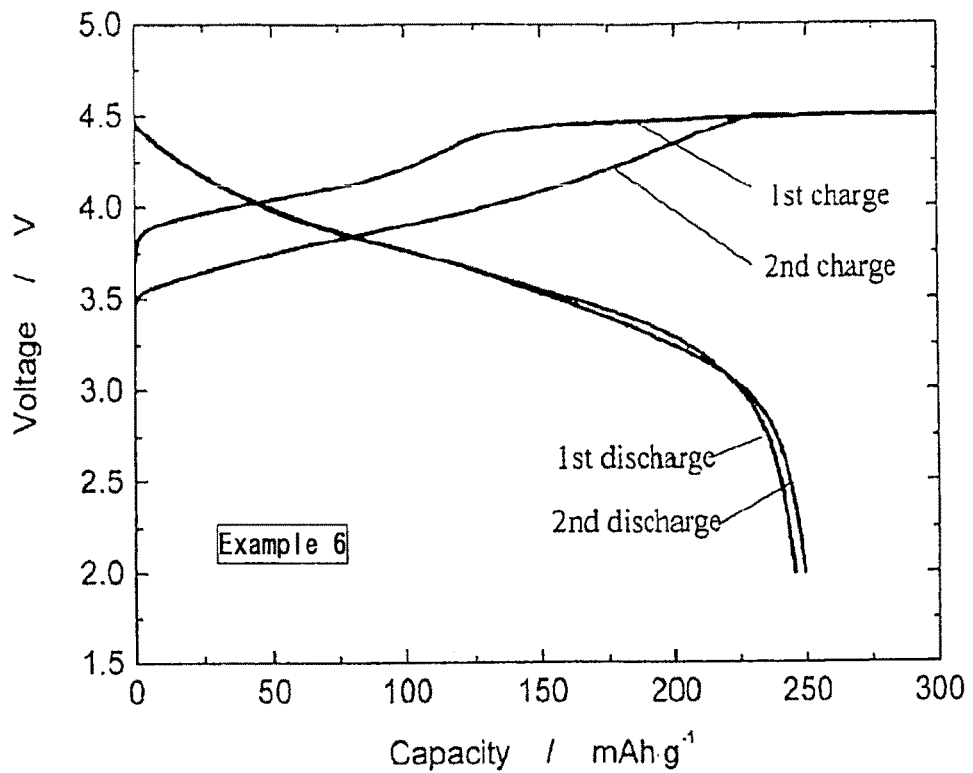
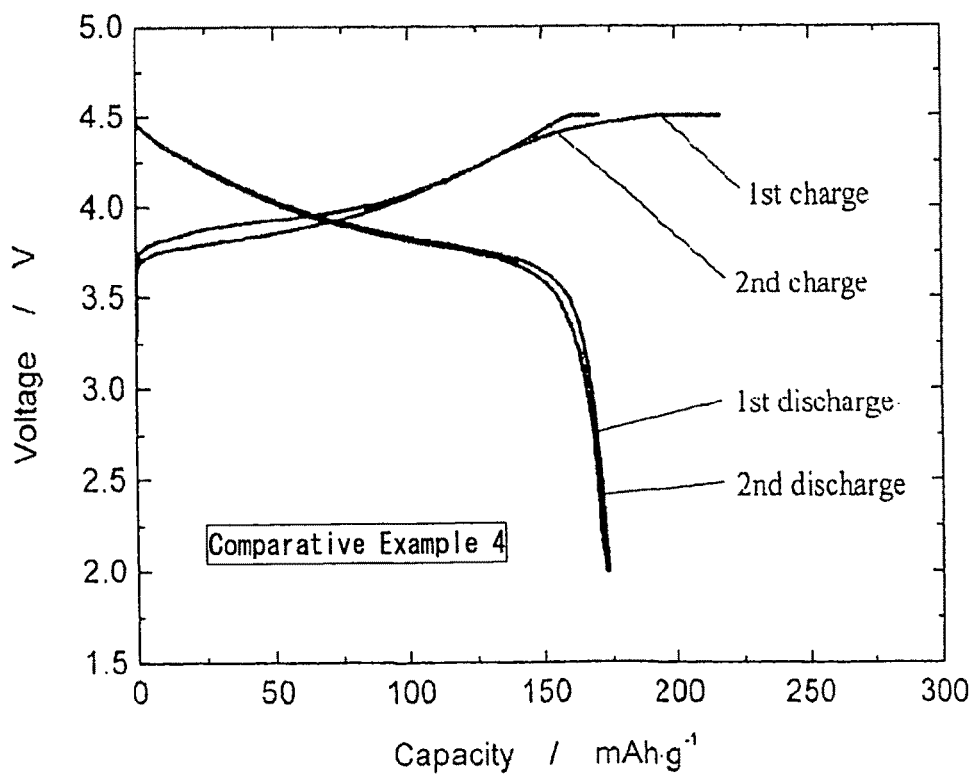

FIG. 10
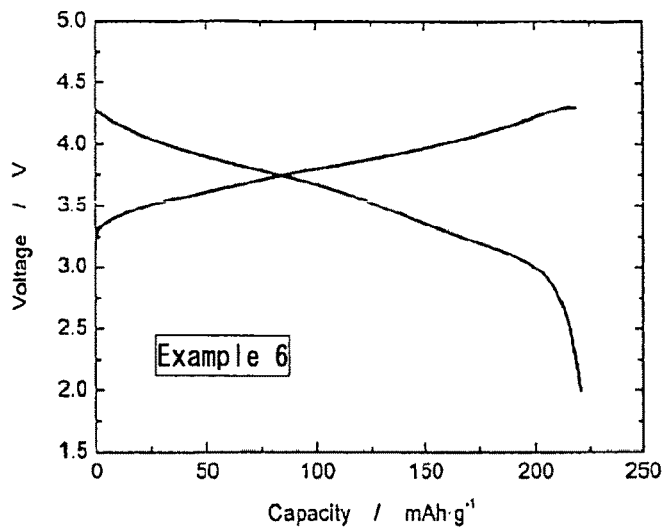
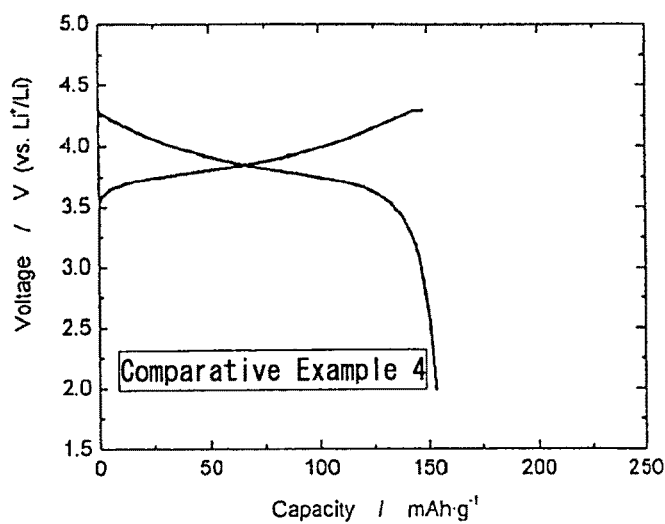
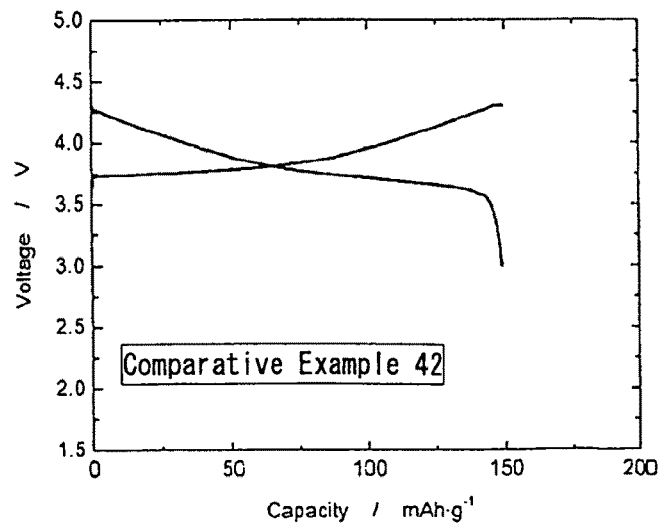

AT18 composition

AT33 composition

PROCESS FOR PRODUCING LITHIUM SECONDARY BATTERY

CROSS-REFERENCE TO RELATED APPLICATION

This is a continuation application of Ser. No. 12/734,579 filed on May 11, 2010.

TECHNICAL FIELD

The present invention relates to an active material for a lithium secondary battery and a lithium secondary battery using the same.

BACKGROUND ART

Conventionally, for a lithium secondary battery, $LiCoO_2$ is mainly used as a positive active material. However, a lithium secondary battery using $LiCoO_2$ as a positive active material has a discharge capacity of about 120 to 130 mAh/g and is also inferior in thermal stability in the battery inside in a charging state.

Therefore, materials obtained by forming solid solutions of $LiCoO_2$ with other compounds are known as the active material for a lithium secondary battery. That is, as an active material for a lithium secondary battery, $Li[Co_{1-2x}Ni_xMn_x]O_2$ ($0<x\leq\frac{1}{2}$), which is a solid solution having an $\alpha$-$NaFeO_2$ type crystal structure shown on a ternary phase diagram of three components, $LiCoO_2$, $LiNiO_2$, and $LiMnO_2$, was disclosed in 2001. A lithium secondary battery using one example of the above-mentioned solid solutions, $LiNi_{1/2}Mn_{1/2}O_2$ or $LiCo_{1/3}Ni_{1/3}Mn_{1/3}O_2$ has a discharge capacity of 150 to 180 mAh/g and is thus more excellent than that using $LiCoO_2$ and also more excellent in thermal stability in the battery inside in a charging state than that using $LiCoO_2$.

However, an active material for a lithium secondary battery with a further higher discharge capacity has been required.

Patent Documents 1 to 4 disclose compounds obtained by adding Fe to $Li[Li_{1/3}Mn_{2/3}]O_2$ as active materials for a lithium secondary battery. Patent Documents 5 to 8 disclose compounds obtained by adding Fe and Ni to $Li[Li_{1/3}Mn_{2/3}]O_2$ as active materials for a lithium secondary battery.

However, although being characterized in that economical iron is used as a raw material, lithium secondary batteries using the materials of the inventions disclosed in Patent Documents 1 to 8 have high polarization as compared with those using conventional positive active materials and are not also excellent in discharge capacity.

Patent Documents 9 and 10 disclose $LiNiO_2$—$Li[Li_{1/3}Mn_{2/3}]O_2$ type solid solutions as active materials for a lithium secondary battery.

However, the active materials for a lithium secondary battery disclosed in Patent Documents 9 and 10 have a problem that their synthesis needs to be carried out in oxygen and synthesis in air is difficult since the electron state of Ni is $Ni^{3+}$. As described above, also in terms of the industrial handling easiness, an active material for a lithium secondary battery in which Ni is present in form of $Ni^{2+}$ is desired. Further, since merely one electron reaction of $Ni^{3+} \rightarrow Ni^{4+}$ is employed in this material, improvement of the discharge capacity of a lithium secondary battery cannot be expected.

Patent Documents 11 and 12 disclose $LiNi_{1/2}Mn_{1/2}O_2$—$Li[Li_{1/3}Mn_{2/3}]O_2$ type solid solutions and the like as active materials for a lithium secondary battery.

However, the discharge capacities of lithium secondary batteries using the materials disclosed in Patent Documents 11 and 12 are far from improvement; the discharge capacities are inferior to those in the case of using $LiNi_{1/2}Mn_{1/2}O_2$ alone.

Patent Documents 13 and 14 disclose materials obtained by allowing $Li[Li_{1/3}Mn_{2/3}]O_2$ to be present on the particle surfaces of $LiMeO_2$ (Me: Co, Ni) as active materials for a lithium secondary battery.

However, the techniques disclosed in Patent Documents 1 to 14 and the techniques disclosed in Patent Documents 15 to 18 described below all fail to improve the discharge capacity, which is an object of the present invention.

Disclosing a concept of employing solid solutions of three components, $Li[Ni_{1/2}Mn_{1/2}]O_2$, $Li[Li_{1/3}Mn_{2/3}]O_2$, and $LiCoO_2$ as a basic structure, Patent Documents 15 and 16 contain descriptions as follows:

"The present invention provides a layered lithium transition metal composite oxide supposed to form a solid solution of
$Li[Ni_{1/2}Mn_{1/2}]O_2$ at a ratio of $(1-3x)(1-y)$
$Li[Li_{1/3}Mn_{2/3}]O_2$ at a ratio of $3x(1-y)$, and
$LiCoO_2$ at a ratio of y,
and having a layered structure, that is, a basic structure of $[Li]^{(3a)}[(Li_xNi_{(1-3x)/2}Mn_{(1+x)/2})_{(1-y)}Co_y]^{(3b)}O_2$ ... (II), wherein (3a) and (3b) respectively represent different metal sites in the layered R(-3)m structure", "However, the important point of the present invention is that z mol of Li is added excessively to the composition represented by the formula (II) and a solid solution represented as

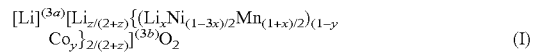

(wherein, $0.01 \leq x \leq 0.15$; $0 \leq y \leq 0.35$; $0.02(1-y)(1-3x) \leq z \leq 0.15(1-y)(1-3x)$); and (3a) and (3b) respectively represent different metal sites in the layered R(-3)m structure." However, also with reference to Comparative Examples, merely those having excess amounts of Li beyond the amounts obtained spontaneously in the case of assuming such solid solutions are concretely described and there is no description that the discharge capacity can be improved by specifying the ratios of those three components in the composition range in which the Li amount is made not to be intentionally in excess.

Patent Document 17 discloses the composition formula: $(Li[Ni_{(x-y)}Li_{(1/3-2x/3)}Mn_{(2/3-x/3-y)}Co_{2y}]O_2$ ($0<x\leq0.5$; $0\leq y\leq\frac{1}{6}$; x>y) in claim 1.

The composition formula disclosed in claim 1 of Patent Document 17 partially overlaps the composition range of the present invention as a broader concept; however there is no description implying the technical idea of employing the solid solution of three components of $Li[Ni_{1/2}Mn_{1/2}]O_2$, $Li[Li_{1/3}Mn_{2/3}]O_2$, and $LiCoO_2$ and the range showing the above-mentioned composition formula widely includes compositions other than those of the solid solution of three components of $Li[Ni_{1/2}Mn_{1/2}]O_2$, $Li[Li_{1/3}Mn_{2/3}]O_2$, and $LiCoO_2$.

Patent Document 18 discloses the composition formula: $(Li[Ni_{(x-y)}Li_{(1/3-2x/3)}Mn_{(2/3-x/3-y)}Co_{2y}]O_2$ (wherein x is more than 0 and 0.5 or less; y is 0 or more and $\frac{1}{6}$ or less, and x>y) in claim 2.

The composition formula disclosed in claim 2 of Patent Document 18 partially overlaps the composition range of the present invention as a broader concept; however as Examples, merely "a compound represented by the composition formula $Li[Ni_{0.5}Mn_{0.5}]O_2$" and "a compound represented by the composition formula $Li[Ni_{0.4}Mn_{0.4}Co_{0.2}]O_2$" are concretely disclosed and they are completely out of the composition range of the present invention. Further, there is no description implying the technical idea of employing the solid solution of three components of $Li[Ni_{1/2}Mn_{1/2}]O_2$, $Li[Li_{1/3}Mn_{2/3}]O_2$, and $LiCoO_2$.

Patent Document 19 discloses a method for synthesizing $Li[Co_{1-2x}Ni_xMn_x]O_2$ having an α-$NaFeO_2$ type crystal structure by producing a hydroxide of transition metals (Co, Ni, Mn) by a coprecipitation method, mixing the hydroxide with a lithium compound, and calcining the mixture.

Patent Document 1: JP-A No. 2002-068748
Patent Document 2: JP-A No. 2002-121026
Patent Document 3: Japanese Patent No. 03500424
Patent Document 4: JP-A No. 2005-089279
Patent Document 5: JP-A No. 2006-036620
Patent Document 6: JP-A No. 2003-048718
Patent Document 7: JP-A No. 2006-036621
Patent Document 8: Japanese Patent No. 03940788
Patent Document 9: JP-A No. 09-055211
Patent Document 10: Japanese Patent No. 03539518
Patent Document 11: JP-A No. 2004-158443
Patent Document 12: Japanese Patent No. 03946687
Patent Document 13: JP-A No. H08-17935
Patent Document 14: Japanese Patent No. 03258841
Patent Document 15: JP-A No. 2006-253119
Patent Document 16: JP-A No. 2007-220475
Patent Document 17: JP-A No. 2004-006267
Patent Document 18: JP-A No. 2004-152753
Patent Document 19: International Publication No. 02/086993

Non-patent Document 1 discloses preparation and electrochemical properties of a solid solution of $LiCoO_2$—$LiNi_{0.5}Mn_{0.5}O_2$—$Li_2MnO_3$ with a high Mn amount and concretely discloses $0.36LiCoO_2$-$0.2LiNi_{1/2}Mn_{1/2}O_2$-$0.44Li_2MnO_3$, $0.27LiCoO_2$-$0.2LiNi_{1/2}Mn_{1/2}O_2$-$0.53Li_2MnO_3$, $0.18LiCoO_2$-$0.2LiNi_{1/2}Mn_{1/2}O_2$-$0.62Li_2MnO_3$, and $0.09LiCoO_2$-$0.2LiNi_{1/2}Mn_{1/2}O_2$-$0.71Li_2MnO_3$; however in a case where the Li content is as high as 1.4 to 1.5, the intensity ratio $I_{(003)}/I_{(104)}$ between the diffraction peaks on (003) plane and (104) plane measured by X-ray diffractometry is about 1.4 (see FIG. 2), which is not 1.56 or higher, and therefore, these solid solutions are apparently different from the active material of the present invention. Further, with respect to the production method, only calcining at 750 to 950° C. after decomposition of respective acetic acid salts at 400° C. by a spray drying method is described but no method of employing a coprecipitation method is described. Moreover, although the discharge capacity is increased to be 200 mAh/g or higher in a potential region of 3.0 to 4.6 V, an increase of the discharge capacity in a potential region of 4.3 V or lower is not indicated.

Non-patent Document 2 discloses that with respect to $Li[Li_{0.182}Ni_{0.182}Co_{0.091}Mn_{0.545}]O_3$, that is, a layered material of $0.545Li[Li_{1/3}Mn_{2/3}]O_2$-$0.364LiNi_{1/2}Mn_{1/2}O_2$-$0.091LiCoO_2$, the discharge capacity is 200 mAh/g or higher in a potential region of 4.6 V to 2.0 V of an initial period and about 160 mAh/g in a potential region of 4.3 V to 2.0 V after cycles in 4.6 V to 2.0 V and therefore, this layered material does not have a high discharge capacity in the potential region of 4.3 V or lower. Further, the layered material is produced by producing a slurry of respective acetic acid salts, drying the slurry at 120° C. and calcining the dried product at 900° C. and thus is not produced by a coprecipitation method and the intensity ratio $I_{(003)}/I_{(104)}$ between the diffraction peaks on (003) plane and (104) plane measured by X-ray diffractometry is about 1, which is not 1.56 or higher, and therefore, the material is apparently different from the active material of the present invention.

Non-patent Document 3 discloses that as a positive active material of a lithium battery, $0.7Li_2MnO_3$·$0.3LiMn_{0.33}Ni_{0.33}Co_{0.33}O_2$ and $0.5Li_2MnO_3$·$0.5LiMn_{0.33}Ni_{0.33}Co_{0.33}O_2$ are shown and with respect to the former, the discharge capacity is 261 mAh/g at 4.8 V charge at 50° C. and 200 mAh/g at 4.6 V charge at 50° C., but improvement of the discharge capacity in a potential region of 4.3 V or lower is not described. Further, the above-mentioned positive active materials are produced by mixing a coprecipitated hydroxide of Co, Ni, and Mn with LiOH, pre-sintering the mixture at 300 or 500° C., and calcining the pre-sintered product at 800 to 1000° C. and the intensity ratio $I_{(003)}/I_{(104)}$ between the diffraction peaks on (003) plane and (104) plane measured by X-ray diffractometry is about 1, which is not 1.56 or higher, and therefore, the materials are apparently different from the active material of the present invention.

Non-patent Document 4 discloses $Li[Li_{1/5}Ni_{1/10}Co_{1/5}Mn_{1/2}]O_2$, that is, a solid solution having a layered crystal structure of $0.6Li[Li_{1/3}Mn_{2/3}]O_2$-$0.2LiNi_{1/2}Mn_{1/2}O_2$-$0.2LiCoO_2$, and the intensity ratio $I_{(003)}/I_{(104)}$ between the diffraction peaks on (003) plane and (104) plane measured by X-ray diffractometry is about 1.4 (see FIG. 3), which is not 1.56 or higher, and therefore, the solid solution is apparently different from the active material of the present invention. Further, with respect to the production method, merely a sol-gel method using respective acetic acid salts is described, and production by using a coprecipitation method is not described. Moreover, although the discharge capacity is described to be 229 mAh/g at 4.5 V; improvement of the discharge capacity in a potential region of 4.3 V or lower is not described.

Non-patent Document 5 discloses an active material of $(1-2x)LiNi_{1/2}Mn_{1/2}O_2$·$xLi[Li_{1/3}Mn_{2/3}]O_2$·$xLiCoO_2$ ($0 \leq x \leq 0.5$), and $0.2LiNi_{1/2}Mn_{1/2}O_2$·$0.4Li[Li_{1/3}Mn_{2/3}]O_2$·$0.4LiCoO_2$, $0.5Li[Li_{1/3}Mn_{2/3}]O_2$-$0.5LiCoO_2$ or the like satisfying the composition formula has composition close to that of the present invention but not in the range of the composition of the present invention. Further, with respect to the production method, merely a solid-phase method using respective acetic acid salts is described, and production using a coprecipitation method is not described. Moreover, since the discharge capacity is about 190 mAh/g at 4.6 V (x=0.4), the discharge capacity in a potential region of 4.3 V or lower is not so high.

Non-patent Document 6 discloses a positive active material of $LiNi_{0.20}Li_{0.20}Mn_{0.60}O_2$, that is, $0.6Li[Li_{1/3}Mn_{2/3}]O_2$-$0.4LiNi_{1/2}Mn_{1/2}O_2$, and the intensity ratio $I_{(003)}/I_{(104)}$ between the diffraction peaks on (003) plane and (104) plane measured by X-ray diffractometry is about 1.7 (see FIG. 7) and the intensity of the diffraction peak of the (104) plane becomes higher than the intensity of the diffraction peak of the (003) plane after discharge, and therefore, this positive active material is apparently different from the active material of the present invention. Further, with respect to the production method, merely a method of calcining powders obtained by heat decomposition of respective acetic acid salts or nitric acid salts is described, and production by using a coprecipitation method is not described. Moreover, the discharge capacity is described to be 288 mAh/g at 4.8 V charge in the initial period and 220 mAh/g after 20 cycles; however improvement of the discharge capacity in a potential region of 4.3 V or lower is not described.

Non-patent Document 7 discloses a positive active material of a layered structure of $(1-x-y)LiNi_{1/2}Mn_{1/2}O_2$·$xLi[Li_{1/3}Mn_{2/3}]O_2$·$yLiCoO_2$ ($0 \leq x=y \leq 0.3$ and x+y=0.5) and since the intensity ratio $I_{(003)}/I_{(104)}$ between the diffraction peaks on (003) plane and (104) plane measured by X-ray diffractometry of $0.5LiNi_{1/2}Mn_{1/2}O_2 \cdot 0.5Li[Li_{1/3}Mn_{2/3}]O_2$ satisfying the composition formula is about 1.4, which is not 1.56 or higher, and therefore, the positive active material is apparently different from the active material of the present invention. Further, with respect to the production method, merely a solid-phase method using respective acetic acid salts is described, and production using a coprecipitation method is not described. Moreover, since the discharge capacity is about 180 mAh/g at 4.6 V, the discharge capacity in a potential region of 4.3 V or lower is not so high.

Non-patent Document 8 discloses a solid solution with a layered structure of $0.5Li(Ni_{0.5}Mn_{0.5})O_2 \cdot 0.5Li(Li_{1/3}Mn_{2/3})O_2$, and in Q24, which is a solid solution of a lithium transition metal composite oxide having an $\alpha$-$NaFeO_2$ type crystal structure, the intensity ratio $I_{(003)}/I_{(104)}$ between the diffraction peaks on (003) plane and (104) plane measured by X-ray diffractometry is about 1.2, which is not 1.56 or higher, and therefore, this solid solution is apparently different from the active material of the present invention. In S24 and VS24, the intensity ratio $I_{(003)}/I_{(104)}$ between the diffraction peaks on (003) plane and (104) plane measured by X-ray diffractometry is 1.56 or higher; however many peaks of impurities are observed and they are not specified as the solid solution of a lithium transition metal composite oxide having an $\alpha$-$NaFeO_2$ type crystal structure. Further, with respect to the production method, merely a method of calcining precursors from respective acetic acid salts is described, and production using a coprecipitation method is not described. Moreover, although the discharge capacity of Q24 is about 210 mAh/g at 4.6 V charge, improvement of the discharge capacity in a potential region of 4.3 V or lower is not described. S24 and VS24 are those having small discharge capacities.

Non-patent Document 9 discloses electrochemical properties of a solid solution of $Li(Li_{(1-x)/3}Co_xMn_{(2-2x)/3}O_2)$ ($0 \leq x \leq 1$), and in $Li(Li_{0.7/3}Co_{0.3}Mn_{1.4/3}O_2)$ satisfying the composition formula, that is, $0.7Li[Li_{1/3}Mn_{2/3}]O_2$-$0.3LiCoO_2$, and $Li(Li_{0.6/3}Co_{0.4}Mn_{1.2/3}O_2)$, that is, $0.6Li[Li_{1/3}Mn_{2/3}]O_2$-$0.4LiCoO_2$, the intensity ratio $I_{(003)}/I_{(104)}$ between the diffraction peaks on (003) plane and (104) plane measured by X-ray diffractometry is about 1.3, which is not 1.56 or higher, and therefore, this solid solution is apparently different from the active material of the present invention. Further, with respect to the production method, merely a method of calcining precursors from respective acetic acid salts is described, and production using a coprecipitation method is not described. Moreover, although the discharge capacity is described to be about 250 mAh/g at 4.6 V charge, improvement of the discharge capacity in a potential region of 4.3 V or lower is not described.

Non-patent Document 10 discloses synthesis, structure, and electrochemical behaviors of $Li[Ni_xLi_{1/3-2x/3}Mn_{2/3-x/3}]O_2$ and with respect to the production method, production using a coprecipitation method is described; however in $Li[Ni_{0.25}Li_{1/6}Mn_{7/12}]O_2$ satisfying the composition formula, that is, a solid solution of $0.5Li[Li_{1/3}Mn_{2/3}]O_2$-$0.5LiNi_{1/2}Mn_{1/2}O_2$ and the like, the intensity ratio $I_{(003)}/I_{(104)}$ between the diffraction peaks on (003) plane and (104) plane measured by X-ray diffractometry is about 1, which is not 1.56 or higher, and therefore, the solid solution is apparently different from the active material of the present invention. Further, although the discharge capacity is described to be about 220 mAh/g at 4.8 V charge, improvement of the discharge capacity in a potential region of 4.3 V or lower is not described (based on the observation of the charge-discharge curve, about 150 mAh/g in terms of 4.3 V).

Non-patent Document 11 discloses synthesis and electrochemical properties of a compound of $Li[Co_xLi_{(1/3-x/3)}Mn_{(2/3-2x/3)}]O_2$, and in a compound of $Li[Co_{0.33}Li_{0.67/3}Mn_{1.34/3}]O_2$ satisfying the composition formula, that is, a compound of $0.67Li[Li_{1/3}Mn_{2/3}]O_2$-$0.33LiCoO_2$, the intensity ratio $I_{(003)}/I_{(104)}$ between the diffraction peaks on (003) plane and (104) plane measured by X-ray diffractometry is about 1.4, which is not 1.56 or higher, and therefore, this compound is apparently different from the active material of the present invention. Further, with respect to the production method, merely a method of calcining powders obtained by heat decomposition of respective acetic acid salts or nitric acid salts is described, and production by using a coprecipitation method is not described. Moreover, although the discharge capacity is described to be about 200 mAh/g at 4.6 V charge, improvement of the discharge capacity in a potential region of 4.3 V or lower is not described (based on the observation of the charge-discharge curve, about 150 to 160 mAh/g in terms of 4.3 V).

Non-patent Document 12 discloses the results of X-ray diffractometry of a positive active material of $Li(Li_{0.2}Ni_{0.2}Mn_{0.6})O_2$ for a lithium secondary battery, that is, a positive active material of $0.6Li[Li_{1/3}Mn_{2/3}]O_2$-$0.4LiNi_{1/2}Mn_{1/2}O_2$ and that the intensity ratio $I_{(003)}/I_{(104)}$ between the diffraction peaks on (003) plane and (104) plane is about 1.6 and 1.7 after discharge is described; however it is about 1.2, which is not 1.56 or higher, after synthesis and before discharge and therefore, the positive active material is apparently different from the active material of the present invention. Further, with respect to the production method, merely a sol-gel method using respective acetic acid salts is described, and production using a coprecipitation method is not described. Moreover, although the discharge capacity is about 200 mAh/g in a potential region of 2.0 to 4.6 V, the discharge capacity is about 110 mAh/g in a potential region of 2.0 to 4.3 V after 4.6 V charge and therefore, the discharge capacity in the potential region of 4.3 V or lower is not so high.

Non-patent Document 13 discloses a nanocrystal of $Li[Li_{0.2}Ni_{0.2}Mn_{0.6}]O_2$, that is $0.6Li[Li_{1/3}Mn_{2/3}]O_2$-$0.4LiNi_{1/2}Mn_{1/2}O_2$, and the intensity ratio $I_{(003)}/I_{(104)}$ between the diffraction peaks on (003) plane and (104) plane measured by X-ray diffractometry is about 1.3, which is not 1.56 or higher, and therefore, this nanocrystal is apparently different from the active material of the present invention. Further, with respect to the production method, merely a method of calcining powders obtained by heat decomposition of respective acetic acid salts or nitric acid salts is described, and production by using a coprecipitation method is not described. Moreover, although the discharge capacity is described to be about 210 mAh/g at 4.8 V charge, improvement of the discharge capacity in a potential region of 4.3 V or lower is not described.

Non-patent Document 14 discloses preparation and electrochemical behaviors of a solid solution of $LiCoO_2$—$Li_2MnO_3(Li[Li_{(x/3)}Co_{(1-x)}Mn_{(2x/3)}]O_2)$, and in $Li[Li_{0.2}Co_{0.4}Mn_{0.4}]O_2$ satisfying the composition formula, that is, a solid solution of $0.6Li[Li_{1/3}Mn_{2/3}]O_2$-$0.4LiCoO_2$ and $Li[Li_{0.23}Co_{0.31}Mn_{0.46}]O_2$, that is, a solid solution of $0.69Li[Li_{1/3}Mn_{2/3}]O_2$-$0.31LiCoO_2$, the intensity ratio $I_{(003)}/I_{(104)}$ between the diffraction peaks on (003) plane and (104) plane measured by X-ray diffractometry (see FIG. 2) is about 2.3 and 1.9, respectively, before charge-discharge, which is 1.56 or higher; however at the end of charge with a charge capacity of 160 mAh or higher, the intensity ratio is considerably lowered (1.4 to 1.7 for the former solid solution, see FIG. 10) and the intensity ratio at the end of discharge in the case of discharge of the active material (solid solution) with the considerably lowered intensity ratio is not made clear and therefore, the active materials cannot be said to be the same as the active material of the present invention. Further, with respect to the production method, merely a method of decomposing respective acetic acid salts at 400° C. by a spray drying method and thereafter, calcining at 750 to 950° C. is described, and production using a coprecipitation method is not described. Moreover, the discharge capacity is about 100 mAh/g at 4.5 V charge and thus it is not so high.

Non-patent Document 15 discloses a positive active material of a layered structure of $0.6LiNi_{0.5}Mn_{0.5}O_2 \cdot xLi_2MnO_3 \cdot yLiCoO_2$ (x+y=0.4), and in $0.6LiNi_{0.5}Mn_{0.5}O_2 \cdot 0.4Li_2MnO_3$ satisfying the composition formula, the intensity ratio $I_{(003)}/I_{(104)}$ between the diffraction peaks on (003) plane and (104) plane measured by X-ray diffractometry is about 1.4, which is not 1.56 or higher, and therefore, this positive active material is apparently different from the active material of the present invention. Further, with respect to the production method, merely a method of calcining powders obtained by heat decomposition of respective acetic acid salts is described, and production using a coprecipitation method is not described. Moreover, although the discharge capacity is described to be about 210 mAh/g at 4.6 V charge, improvement of the discharge capacity in a potential region of 4.3 V or lower is not described (about 150 mAh/g in terms of 4.3V).

Non-patent Document 16 discloses a positive active material of $Li[Li_{0.15}Ni_{0.275}Mn_{0.575}]O_2$ for a lithium secondary battery, that is, a positive active material of $0.45Li[Li_{1/3}Mn_{2/3}]O_2 \text{-} 0.55LiNi_{1/2}Mn_{1/2}O_2$ and the intensity ratio $I_{(003)}/I_{(104)}$ between the diffraction peaks on (003) plane and (104) plane measured by X-ray diffractometry is about 1, which is not 1.56 or higher, and therefore, this positive active material is apparently different from the active material of the present invention. Further, with respect to the production method, merely a sol-gel method using respective acetic acid salts is described, and production using a coprecipitation method is not described. Moreover, although the discharge capacity is described to be about 180 mAh/g at 4.6 V charge, improvement of the discharge capacity in a potential region of 4.3 V or lower is not described (about 140 mAh/g in terms of 4.3V).

Non-patent Document 17 discloses synthesis and electrochemical properties of $Li[Li_{(1-2x)/3}Ni_xMn_{(2-x)/3}]O_2$ as a positive active material for a lithium secondary battery, and in $Li[Li_{0.15}Ni_{0.275}Mn_{0.575}]O_2$ satisfying the composition formula, that is, a positive active material of $0.45Li[Li_{1/3}Mn_{2/3}]O_2 \text{-} 0.55LiNi_{1/2}Mn_{1/2}O_2$, the intensity ratio $I_{(003)}/I_{(104)}$ between the diffraction peaks on (003) plane and (104) plane measured by X-ray diffractometry is about 1, which is not 1.56 or higher, and therefore, the positive active material is apparently different from the active material of the present invention. Further, with respect to the production method, merely a sol-gel method using respective acetic acid salts is described, and production using a coprecipitation method is not described. Moreover, although the discharge capacity is described to be about 190 mAh/g at 4.6 V charge, improvement of the discharge capacity in a potential region of 4.3 V or lower is not described (about 140 mAh/g in terms of 4.3V).

Non-patent Document 1: Electrochimica Acta 51 (2006) 5581-5586

Non-patent Document 2: Electrochemistry Communications 7 (2005)1318-1322

Non-patent Document 3: Electrochemistry Communications 9 (2007)787-795

Non-patent Document 4: Journal of Power Sources 146 (2005)281-286

Non-patent Document 5: Journal of Power Sources 146 (2005)598-601

Non-patent Document 6: Solid State Ionics 176 (2005) 1035-1042

Non-patent Document 7: Journal of The Electrochemical Society, 152(1)A171-A178 (2005)

Non-patent Document 8: Journal of Power Sources 124 (2003)533-537

Non-patent Document 9: Electrochemistry Communications 9 (2007)103-108

Non-patent Document 10: Journal of The Electrochemical Society, 149(6)A777-A791 (2002)

Non-patent Document 11: Journal of The Electrochemical Society, 151(5)A720-A727 (2004)

Non-patent Document 12: Electrochemical and Solid-State Letters, 6(9) A183-A186 (2003)

Non-patent Document 13: Electrochemical and Solid-State Letters, 6(8) A166-A169 (2003)

Non-patent Document 14: Journal of Power Sources 159 (2006)1353-1359

Non-patent Document 15: Materials Letters 58 (2004) 3197-3200

Non-patent Document 16: Journal of Materials Chemistry, 2003, 13, 319-322

Non-patent Document 17: Journal of Power Sources 112 (2002)634-638

DISCLOSURE OF THE INVENTION

Problems to be Solved by the Invention

In consideration of the above-mentioned problems, it is an object of the present invention to provide an active material for a lithium secondary battery with a high discharge capacity, particularly capable of increasing the discharge capacity in a potential region of 4.3 V or lower and a method for producing the same. It is also an object of the invention to provide a lithium secondary battery with a high discharge capacity and a method for producing the same.

Means for Solving the Problems

The present invention will be described, with reference to the technical idea. However, the functional mechanism includes assumption and whether the assumption is correct or not does not limit the present invention at all. The invention can be carried out in various manners without departing from the spirit and main characteristics of the invention. Accordingly, the invention should not to be construed as being limited since the foregoing embodiments or experimental examples are only illustrations in any ways. The scope of the invention is shown by the claims and is not bound to the specification. Modifications and alterations belonging to the equivalent scope of the claims are within the invention.

In the case of using conventionally known $LiMnO_2$ as an active material for a lithium secondary battery, since Jahn-Teller distortion attributed to the redox reaction of $Mn^{4+}/Mn^{3+}$ in the charge-discharge process is caused, a stable discharge capacity cannot be obtained.

Further, in a conventionally known material of $Li[Co_{1-2x}Ni_xMn_x]O_2$ ($0<x\leq\frac{1}{2}$), which is a solid solution having an $\alpha$-$NaFeO_2$ type crystal structure shown on a ternary phase diagram of three components, $LiCoO_2$, $LiNiO_2$, and $LiMnO_2$, regarding the valences of the transition metal elements at the time of synthesis, the valences of not only Co and Ni but also Mn are fluctuated along with charge-discharge. However, only in a particular case where Ni and Mn are present at the same ratio, it is experimentally known that electron state of $Ni^{2+}$, $Mn^{4+}$ or $Co^{3+}$ is possible and only in this case, since the valence of Mn is not changed as being tetravalence even if electrochemical reduction and oxidation (insertion/extraction of lithium) is carried out, it is supposed that a desirable reversible property can be obtained. In addition, in this case, along with the electrochemical oxidation, the valence of Ni is changed from divalence to trivalence and further to tetravalence and the valence of Co is changed from trivalence to tetravalence. Herein, a particular case where Ni and Mn are present at the same ratio is corresponding to a point on the straight line shown in the ternary phase diagram of three components, $LiCoO_2$, $LiNiO_2$, and $LiMnO_2$. However, out of the straight line, electron state of $Ni^{2+}$, $Mn^{4+}$ or $Co^{3+}$ becomes impossible and it results in failure of obtaining an excellent discharge capacity and charge-discharge cycle performance.

Materials supposed to have the valences of the respective metal elements as $Li^+$, $Co^{3+}$, $Ni^{2+}$, and $Mn^{4+}$ are also discovered partially in Patent Documents 15 to 18.

However, as described above, even if with reference to the descriptions of Patent Documents 15 to 18, it is impossible to obtain any material having a discharge capacity as a secondary battery higher than that of a conventional material.

There is monoclinic $Li[Li_{1/3}Mn_{2/3}]O_2$ as a representative layered structure containing $Li^+$ and $Mn^{4+}$. As described in the above-mentioned Patent Documents 1 to 14, various compounds based on this $Li[Li_{1/3}Mn_{2/3}]O_2$ have been investigated so far. However, it is known that $Li[Li_{1/3}Mn_{2/3}]O_2$ is scarcely possible to obtain a charge-discharge capacity if it is used alone. It is supposedly because no redox reaction of $Mn^{4+} \rightarrow Mn^{5+}$ is generated in the stable range of a common organic electrolyte solution.

Focusing on that the valence of Mn in the above-mentioned $Li[Li_{1/3}Mn_{2/3}]O_2$ is tetravalence, the present inventors have made investigations of forming a solid solution of $Li[Li_{1/3}Mn_{2/3}]O_2$ with other compounds. Consequently, the inventors have supposed that even if electrochemical reduction and oxidation (charge-discharge) is carried out, the valence of Mn is not changed from tetravalence but the valences of transition metal elements constituting other compounds forming a solid solution with $Li[Li_{1/3}Mn_{2/3}]O_2$ can be changed and accordingly a high discharge capacity can be obtained and also a stable charge-discharge cycle performance can be obtained.

Further, the present inventors have made investigations of a ternary solid solution of $LiCoO_2$—$LiNi_{1/2}Mn_{1/2}O_2$—$Li[Li_{1/3}Mn_{2/3}]O_2$ by adding $LiCoO_2$ to the binary phase diagram. Since $LiCoO_2$ is excellent in the initial charge-discharge efficiency and also excellent in the high rate charge-discharge property, the inventors have supposed that these properties could be utilized advantageously.

The ternary solid solution is expressed as a ternary phase diagram as shown in FIG. 1. All compounds on this matrix are present by taking the forms of $Co^{3+}$, $Ni^{2+}$, and $Mn^{4+}$. That is, in the above-mentioned $LiCoO_2$—$LiNiO_2$—$LiMnO_2$ system, as shown in FIG. 2, Ni and Mn can be present as $Ni^{2+}$ and $Mn^{4+}$ only on the line where Ni and Mn are present at the same ratio, whereas in the ternary solid solution of $LiCoO_2$—$LiNi_{1/2}Mn_{1/2}O_2$—$Li[Li_{1/3}Mn_{2/3}]O_2$, Co, Ni, and Mn can be present in the forms of $Co^{3+}$, $Ni^{2+}$, and $Mn^{4+}$ in any point within the phase.

Accordingly, the above-mentioned ternary solid solution, which is a base of the present invention, can be represented as $x\{Li[Li_{1/3}Mn_{2/3}]O_2\} \cdot y\{LiNi_{1/2}Mn_{1/2}O_2\} \cdot (z=1-x-y)\{LiCoO_2\}$. This is deformed to lead the formula, $Li_{1+(1/3)x}Co_{1-x-y}Ni_{(1/2)y}Mn_{(2/3)x+(1/2)y}O_2$. Herein, in accordance with the definition, $0 \leq x$, $0 \leq y$, and $x+y \leq 1$.

The present inventors have found that in a case where x is particularly in a range satisfying $1/3 < x$ in the ternary solid solution, a lithium secondary battery using the material as an active material shows a considerably higher discharge capacity than that in the case of using a conventional material and simultaneously have found that the battery is also excellent in the cycle stability and thus have previously filed an application as Japanese Patent Application No. 2007-293777. Further, the inventors have found that in a case where x is particularly in a range satisfying $1/3 < x \leq 2/3$ in the ternary solid solution, a lithium secondary battery using the material as an active material shows a considerably higher discharge capacity than that in the case of using a conventional material and simultaneously have found that the battery is also excellent in the cycle stability and thus have previously filed an application as Japanese Patent Application No. 2007-330259.

Now, the inventors have found that in a case where x is in a specified range satisfying $1/3 < x$ and a specified property is satisfied in the ternary solid solution, a lithium secondary battery using the material as an active material has a considerably high discharge capacity, particularly a very high discharge capacity in a potential region of 4.3 V or lower.

As being understood from the composition formula, one characteristic of the active material composition of the present invention is that the Li content is high as compared with that of a conventional active material. In view of merely this point, the active material composition of the invention cannot be expressed by plotting on the composition diagram of FIG. 2 describing a conventional technique. Further, the composition diagram of FIG. 2 cannot express the case of $a+b+c=1$ in the composition formula, $Li_qCo_aNi_bMn_cO_d$, likewise the material of the invention.

Herein, the present invention provides an active material for a lithium secondary battery including a solid solution of a lithium transition metal composite oxide having an $\alpha$-$NaFeO_2$-type crystal structure, in which the composition ratio of Li, Co, Ni, and Mn contained in the solid solution satisfies $Li_{1+(1/3)x}Co_{1-x-y}Ni_{(1/2)y}Mn_{(2/3)x+(1/2)y}$ ($x+y \leq 1$, $0 \leq y$ and $1-x-y=z$); in an $Li[Li_{1/3}Mn_{2/3}]O_2(x)$-$LiNi_{1/2}Mn_{1/2}O_2$ (y)-$LiCoO_2(z)$ type ternary phase diagram, (x, y, z) is represented by values in a range present on or within a line of a heptagon (ABCDEFG) defined by the vertexes; point A(0.45, 0.55, 0), point B(0.63, 0.37, 0), point C(0.7, 0.25, 0.05), point D(0.67, 0.18, 0.15), point E(0.75, 0, 0.25), point F(0.55, 0, 0.45), and point G(0.45, 0.2, 0.35); and the intensity ratio between the diffraction peaks on (003) plane and (104) plane measured by X-ray diffractometry before charge-discharge is $I_{(003)}/I_{(104)} \geq 1.56$ and at the end of discharge is $I_{(003)}/I_{(104)} > 1$.

Herein, "before charge-discharge" in the present invention means until the time when first electrochemical electric communication is carried out after synthesis of the active material.

Further, "at the end of discharge" means after discharge of 160 mAh/g or higher (after discharge of 177 mAh/g or higher in Examples). Concretely, as shown in Examples, charging to 4.3 V (vs. Li/Li+) is carried out and then constant current discharge at 0.1 ItA current is carried out and the time point when the termination voltage becomes 2.0 V is defined as the end of discharge.

In general, in a case where a lithium transition metal composite oxide having an $\alpha$-$NaFeO_2$ type crystal structure is synthesized through a calcining step, it is known that the composition of a compound to be obtained actually is slightly fluctuated as compared with the composition calculated from the composition ratio of loaded raw materials. The present invention can be carried out without departing from the technical idea or main characteristics of the invention and needless to say, it should not be construed such that the fact that the composition obtained by synthesis is not strictly identical with the above-mentioned composition formula does not belong to the scope of the invention. Particularly, with respect to the Li amount, it is known that evaporation occurs easily in the calcining step. Further, the coefficient of oxygen atom tends to be fluctuated in accordance with the synthesis conditions or the like. In the composition formula of claim 1 of the invention, the coefficient of oxygen atom is not defined. The coefficient of O of $Li[Li_{1/3}Mn_{2/3}]O_2(x)$-$LiNi_{1/2}Mn_{1/2}O_2$ $(y)$-$LiCoO_2(z)$ in the ternary phase diagram is not limited strictly to 2 but includes deficiency.

The active material of the invention may contain other elements other than Li, Co, Ni, Mn, and O and also, in a case where the active material contains other elements other than Li, Co, Ni, Mn, and O if Li, Co, Ni, and Mn are given from the elements constituting the solid solution, the composition ratio satisfies the definition of the invention and the effect of the invention is exerted, those containing other elements are also within the technical scope of the invention. Examples of the other elements other than Li, Co, Ni, Mn, and O may be transition metals other than Co, Ni, and Mn.

The active material for a lithium secondary battery of the present invention is capable of charge-discharge at around 4.5 V (vs. $Li/Li^+$) of the positive electrode potential. However, depending on the type of a nonaqueous electrolyte to be used, if the positive electrode potential is too high at the time of charging, there is a fear that the nonaqueous electrolyte is oxidized and decomposed and the battery performance is lowered. Consequently, it is sometimes required to obtain a lithium secondary battery having a sufficient discharge capacity even if a charging method of adjusting the maximum achieved potential of the positive electrode upon charging to 4.3 V (vs. $Li/Li^+$) or lower is employed at the time of use. In a case where an active material for a lithium secondary battery in which (x, y, z) is within the above-mentioned range, and the intensity ratio between the diffraction peaks on (003) plane and (104) plane measured by X-ray diffractometry satisfies the above-mentioned condition is used, even if a charging method of adjusting the maximum achieved potential of the positive electrode upon charging to 4.3 V (vs. $Li/Li^+$) or lower is employed at the time of use, it is made possible to obtain a discharge electric quantity of 177 mAh/g or higher (almost all 180 mAh/g or higher), which exceeds the capacity of a conventional positive active material.

Accordingly, the invention provides an active material for a lithium secondary battery including a solid solution of a lithium transition metal composite oxide having an $\alpha$-$NaFeO_2$-type crystal structure, in which the composition ratio of Li, Co, Ni, and Mn contained in the solid solution satisfies $Li_{1+(1/3)x}Co_{1-x-y}Ni_{(1/2)y}Mn_{(2/3)x+(1/2)y}$ $(x+y \leq 1, 0 \leq y, $ and $1-x-y=z)$; in an $Li[Li_{1/3}Mn_{2/3}]O_2(x)$-$LiNi_{1/2}Mn_{1/2}O_2(y)$-$LiCoO_2(z)$ type ternary phase diagram, (x, y, z) is represented by values in a range present on or within a line of a heptagon (ABCDEFG) defined by the vertexes; point A(0.45, 0.55, 0), point B(0.63, 0.37, 0), point C(0.7, 0.25, 0.05), point D(0.67, 0.18, 0.15), point E(0.75, 0, 0.25), point F(0.55, 0, 0.45), and point G(0.45, 0.2, 0.35); and the intensity ratio between the diffraction peaks on (003) plane and (104) plane measured by X-ray diffractometry at the end of discharge is $I_{(003)}/I_{(104)}>1$ and the dischargeable electric quantity in a potential region of 4.3 V (vs. $Li/Li^+$) or lower is 177 mAh/g or higher.

With respect to the active material for a lithium secondary battery, the above-mentioned (x, y, z) is preferably represented by values in a range present on or within a line of a tetragon (HIJK) defined by the vertexes; point H(0.6, 0.4, 0), point I(0.67, 0.13, 0.2), point J(0.7, 0, 0.3), and point K(0.55, 0.05, 0.4).

In the case of being within the range, even if a charging method of adjusting the maximum achieved potential of the positive electrode at the time of charging to 4.3 V (vs. $Li/Li^+$) or lower is employed, it is made possible to obtain a discharge electric quantity of 198 mAh/g or higher (almost all 200 mAh/g or higher), which significantly exceeds the capacity of a conventional positive active material.

Further, the present invention provides a lithium secondary battery including such an active material for a lithium secondary battery.

Herein, those containing merely a mixture of a $LiCoO_2$ powder, a $LiNi_{1/2}Mn_{1/2}O_2$ powder, and a $Li[Li_{1/3}Mn_{2/3}]O_2$ powder is not included in the "solid solution" contained in the active material for a lithium secondary battery of the present invention. Since simple mixture of these three materials have respectively different peak positions corresponding to the lattice constants and observed in the case of measuring by X-ray diffractometry, when X-ray diffractometry is carried out, diffraction patterns corresponding to the respective simple mixture can be obtained. However, the solid solution of a lithium transition metal composite oxide having an $\alpha$-$NaFeO_2$ type crystal structure of the invention forms solid solution of at least a portion of $Li[Li_{1/3}Mn_{2/3}]O_2$ with $LiCoO_2$ and/or $LiNi_{1/2}Mn_{1/2}O_2$. Even if the above-mentioned (x, y, z) is in the above-mentioned range, in a case where $Li[Li_{1/3}Mn_{2/3}]O_2$ does not at all form a solid solution with $LiCoO_2$ and/or $LiNi_{1/2}Mn_{1/2}O_2$, the effect of the invention to give a lithium battery with a high discharge capacity cannot be exerted.

Furthermore, the active material for a lithium secondary battery of the present invention is an active material present in a range satisfying $x > 1/3$ and has a diffraction peak observed near $2\theta=20$ to $30°$ in X-ray diffractometry using $CuK\alpha$ radiation for the monoclinic $Li[Li_{1/3}Mn_{2/3}]O_2$. It is supposed to be a super-lattice line observed in a case where $Li^+$ and $Mn^{4+}$ are arranged in a regular order. In the invention, those particularly excellent in the discharge capacity have about 4 to 7% intensity of the monoclinic type diffraction peak observed near 21° to the diffraction peak intensity of the hexagonal (003) plane, which is a main peak. The intensity of the monoclinic type diffraction peak observed near 21° is increased in proportion to the increase of the ratio of $Li[Li_{1/3}Mn_{2/3}]O_2$ in the solid solution. As a result, with respect to an active material with the intensity of the monoclinic type diffraction peak observed near 21° exceeding 7% to the diffraction peak intensity of the hexagonal (003) plane, which is a main peak, it becomes contrarily difficult to obtain a sufficient discharge capacity.

Herein, in the present invention, the solid solution of a lithium transition metal composite oxide is characterized in that a diffraction peak observed for the monoclinic $Li[Li_{1/3} Mn_{2/3}]O_2$ is observed near 20 to 30° in X-ray diffractometry using $CuK\alpha$ radiation.

Moreover, the present inventors have found that an active material for a lithium secondary battery capable of particularly giving a lithium secondary battery with a high discharge capacity can be reliably synthesized in the case of producing a precursor by coprecipitation of a hydroxide containing Co, Ni, and Mn in a solvent when a solid solution of a lithium transition metal composite oxide is obtained through the steps of mixing the precursor containing the transition metal elements and a lithium compound and then calcining the mixture. The inventors suppose that it is relevant to the fact that the distribution of the transition metals (Co, Ni, Mn) in the precursor is uniformly carried out by a coprecipitation method of the transition metal hydroxide as the precursor. In addition, the description of Patent Document 19 is a good reference with respect to a preferable method for producing such a precursor.

Herein, the present invention provide a method for producing an active material for a lithium secondary battery, in which the solid solution of a lithium transition metal composite oxide is produced through the steps of producing a precursor by coprecipitation of a hydroxide containing Co, Ni, and Mn in a solvent, mixing the precursor and a lithium compound and calcining the mixture.

In order to produce a lithium secondary battery capable of giving a sufficient discharge capacity by using the active material for a lithium secondary battery of the present invention and even if employing a charging method of adjusting the maximum achieved potential of the positive electrode upon charging to 4.3 V (vs. Li/Li$^+$) or lower at the time of use, it is important to provide a charging step in consideration of the characteristic behavior of the active material for a lithium secondary battery of the invention in the production method of the lithium secondary battery. That is, if constant current charging is continued by using the active material for a lithium secondary battery of the invention as a positive electrode, a region with relatively flat potential fluctuation is observed for a relatively long period in a positive electrode potential of 4.3 V to 4.8 V. FIG. 9 shows comparison of the positive electrode potential behaviors when charging is first carried out for the respective positive electrodes using the active materials for a lithium secondary battery of Example 6 (AT17) and Comparative Example 4 (AT11). The curve shown as "1st charge" in the drawing corresponds to this. As being observed in FIG. 9A (Example 6), a region with relatively flat potential fluctuation is observed for a relatively long period at a potential of around 4.45 V from a moment when the charge electricity exceeds 100 mAh/g in the first charging. On the other hand, in FIG. 9B (Comparative Example 4), such a flat region is scarcely observed. The charging conditions used herein are a constant current and constant voltage charge of 0.1 ItA current and 4.5 V (vs. Li/Li$^+$) voltage (positive electrode potential) and even if the charging voltage is set to be further higher, the region with relatively flat potential fluctuation for a relatively long period is scarcely observed in the case of using a material with an x value of ⅓ or lower. On the other hand, in the case of a material with an x value exceeding ⅔, the region becomes short even if the region with relatively flat potential fluctuation is observed. Further, this behavior cannot be observed for a conventional Li[Co$_{1-2x}$Ni$_x$Mn$_x$]O$_2$ (0≦x≦½) material. This behavior is characteristic for the active material for a lithium secondary battery of the invention.

Herein, the present invention provides a method for producing the lithium secondary battery by employing a charging method where the positive electrode upon charging has a maximum achieved potential of 4.3 V (vs. Li/Li$^+$) or lower, in which the method includes the step of charging to reach at least a region with relatively flat potential appearing in a positive electrode potential region of exceeding 4.3 V (vs. Li/Li$^+$) and 4.8 V (vs. Li/Li$^+$) or lower.

Herein, it is required to carry out the charging in the initial charge-discharge step before completion of a battery to the extent of reaching the flat potential region. Since the flat potential region continues relatively long (e.g., 100 mAh/g or higher), it is preferable that the charging continues so as to be through the step as much as possible. Herein, in a case where the terminal of the flat potential region due to a potential increase or the like is observed, it may be regarded as the charging termination condition, or in a case where constant current and constant voltage charging is employed to allow the electric current value to be attenuated to a set value, it may be regarded as the charging termination condition.

Effects of the Invention

Accordingly, the present invention can provide an active material for a lithium secondary battery with a high discharge capacity, particularly capable of increasing the discharge capacity in a potential region of 4.3 V or lower and can also provide a lithium secondary battery with a high discharge capacity.

BRIEF DESCRIPTION OF THE DRAWINGS

FIG. 5: X-ray diffraction patterns of conventional active materials made of LiNi$_{0.20}$Li$_{0.20}$Mn$_{0.60}$O$_2$ and LiCo$_{0.20}$Li$_{0.27}$Mn$_{0.53}$O$_2$ before charge-discharge, after charge, and after discharge.

FIG. 7: A view showing the XAFS measurement results of active materials of Examples 1 to 4 and Comparative Example 41.

FIG. 9: A view showing the potential behaviors at the time of initial charge-discharge carried out in the lithium secondary battery production method using the active materials of Example 6 (AT17) and Comparative Example 4 (AT11).

FIG. 10: A view showing the potential behaviors of lithium secondary batteries using the active materials of Example 6, Comparative Example 4, and Comparative Example 42.

BEST MODE FOR CARRYING OUT THE INVENTION

As described above, in the active material for a lithium secondary battery of the present invention is characterized in that in an Li[Li$_{1/3}$Mn$_{2/3}$]O$_2$(x)-LiNi$_{1/2}$Mn$_{1/2}$O$_2$(y)-LiCoO$_2$(z) type ternary phase diagram, (x, y, z) is represented by values in a range present on or within a line of a heptagon (ABCDEFG) defined by the vertexes; point A(0.45, 0.55, 0), point B(0.63, 0.37, 0), point C(0.7, 0.25, 0.05), point D(0.67, 0.18, 0.15), point E(0.75, 0, 0.25), point F(0.55, 0, 0.45), and point G(0.45, 0.2, 0.35), and that the intensity ratio between the diffraction peaks on (003) plane and (104) plane measured by X-ray diffractometry before charge-discharge is $I_{(003)}/I_{(104)} \geqq 1.56$ and at the end of discharge is $I_{(003)}/I_{(104)} > 1$.

Figure 13:
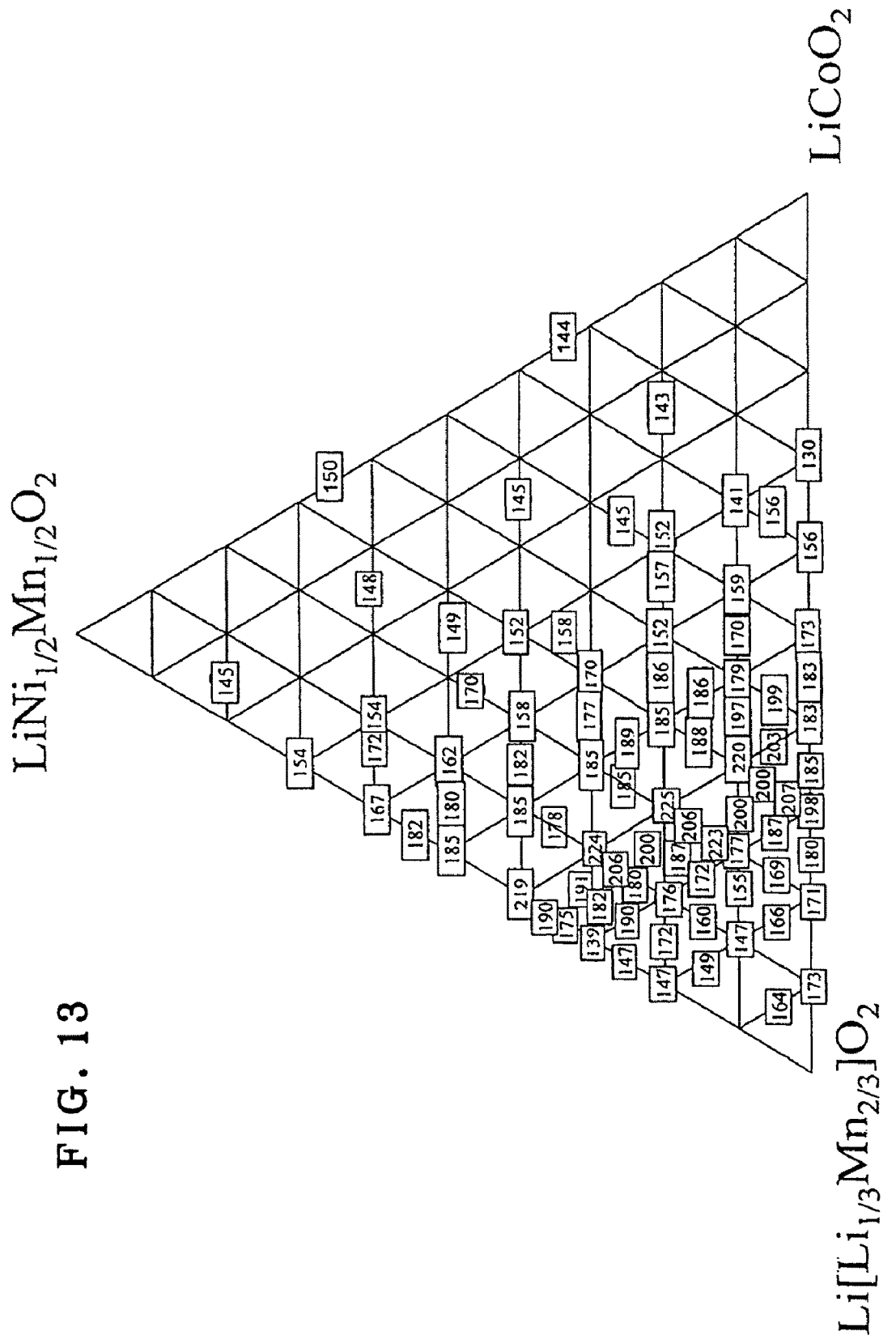
FIG. 13: An Li[Li$_{1/3}$Mn$_{2/3}$]O$_2$(x)-LiNi$_{1/2}$Mn$_{1/2}$O$_2$(y)-LiCoO$_2$(z) type ternary phase diagram in which the discharge capacity values of active materials of Examples 1 to 44 and Comparative Examples 1 to 40 are plotted.

As shown in FIG. 13 and following Table 1 and Table 2, in a case where (x, y, z) is a value in the above-mentioned range, the discharge capacity in a potential rang of 4.3 V or lower becomes 177 mAh/g or higher; however if it is out of the range, only a discharge capacity of 176 mAh/g or lower is obtained and in order to obtain an active material capable of increasing the discharge capacity, (x, y, z) needs to be in the specified range.

Further, it is found that within the heptagon ABCDEFG, if (x, y, z) is in a range present on or within a line of a tetragon HIJK defined by the vertexes; point H(0.6, 0.4, 0), point I(0.67, 0.13, 0.2), point J(0.7, 0, 0.3), and point K(0.55, 0.05, 0.4), a particularly high discharge capacity (198 mAh/g or higher) can be obtained.

Furthermore, with respect to the intensity ratio $I_{(003)}/I_{(104)}$ between the diffraction peaks on (003) plane and (104) plane measured by X-ray diffractometry, the following can be assumed.

Figure 3:
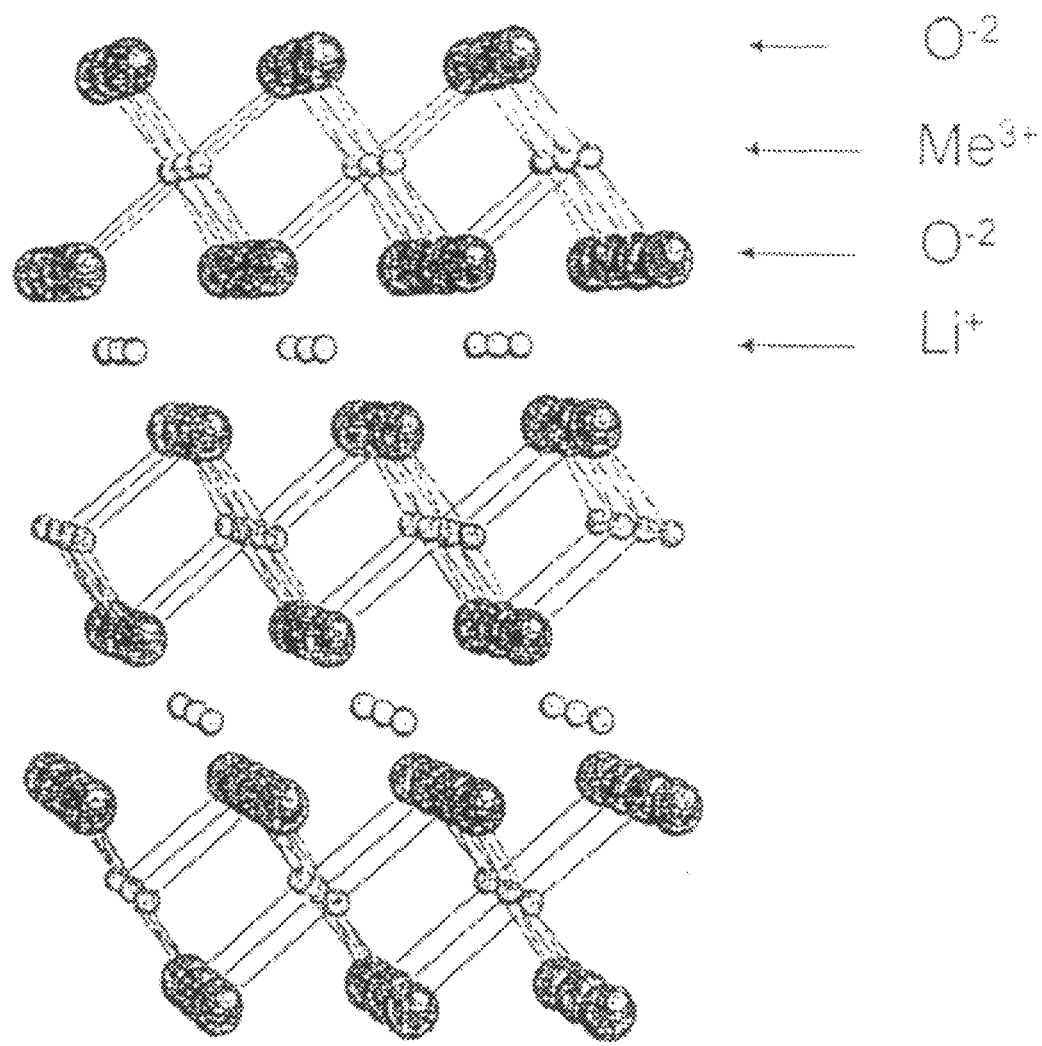
FIG. 3: A view showing the crystal structure of an active material having a composition formula: Li$_{1+(1/3)x}$Co$_{1-x-y}$Ni$_{(1/2)y}$Mn$_{(2/3)x+(1/2)y}$ (x+y≦1 and 0≦y).

The active material with a composition formula: $Li_{1+(1/3)x}Co_{1-x-y}Ni_{(1/2)y}Mn_{(2/3)x+(1/2)y}$ ($x+y \leqq 1$ and $0 \leqq y$) has a layered structure as shown in FIG. 3 and the $Me^{3+}$ layer is configured by $Li^+$, $Co^{3+}$, $Ni^{2+}$, and $Mn^{4+}$. Further, with respect to the active material having a layered structure as shown in FIG. 3, if $Ni^{3+}$ is contaminated in a portion of the $Li^+$ layer and $Li^+$ is contaminated in a portion of the $Ni^{3+}$ layer, the intensity of $I_{(104)}$ is supposed to be higher. Therefore, taking up a representative layered oxide, $LiNiO_2$ ($Me^{3+}$ layer is only $Ni^{3+}$), and assuming that so-called disorder phase ($Li_{0.8}Ni_{0.2}$)[$Ni_{0.8}Li_{0.2}$]$O_2$ in which $Ni^{3+}$ is contaminated in a portion of the $Li^+$ layer and $Li^+$ is contaminated in a portion of the $Ni^{3+}$ layer is formed, the X-ray diffraction pattern is simulated by theoretical calculation and the result is shown in FIG. 4.

Figure 4A:
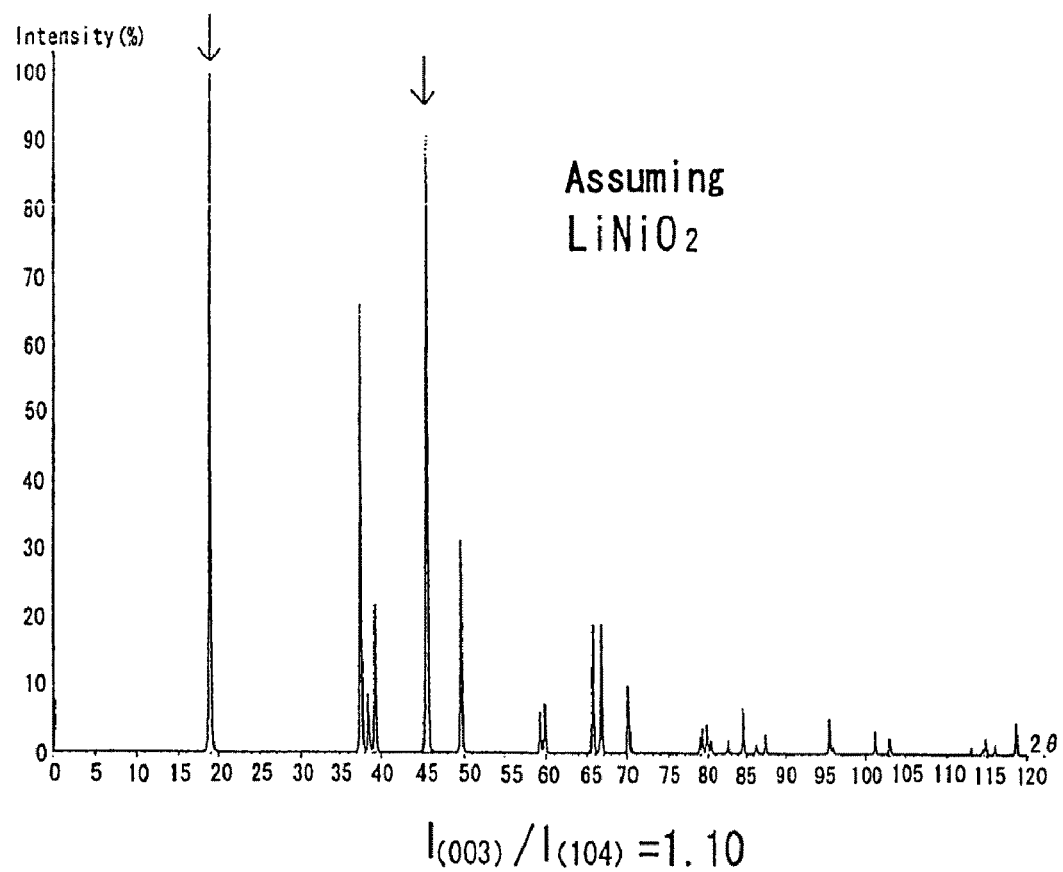
FIG. 4A: An X-ray diffraction pattern of an active material assumed to be LiNiO$_2$ (simulation result close to the measurement result of the present invention).
Figure 4B:
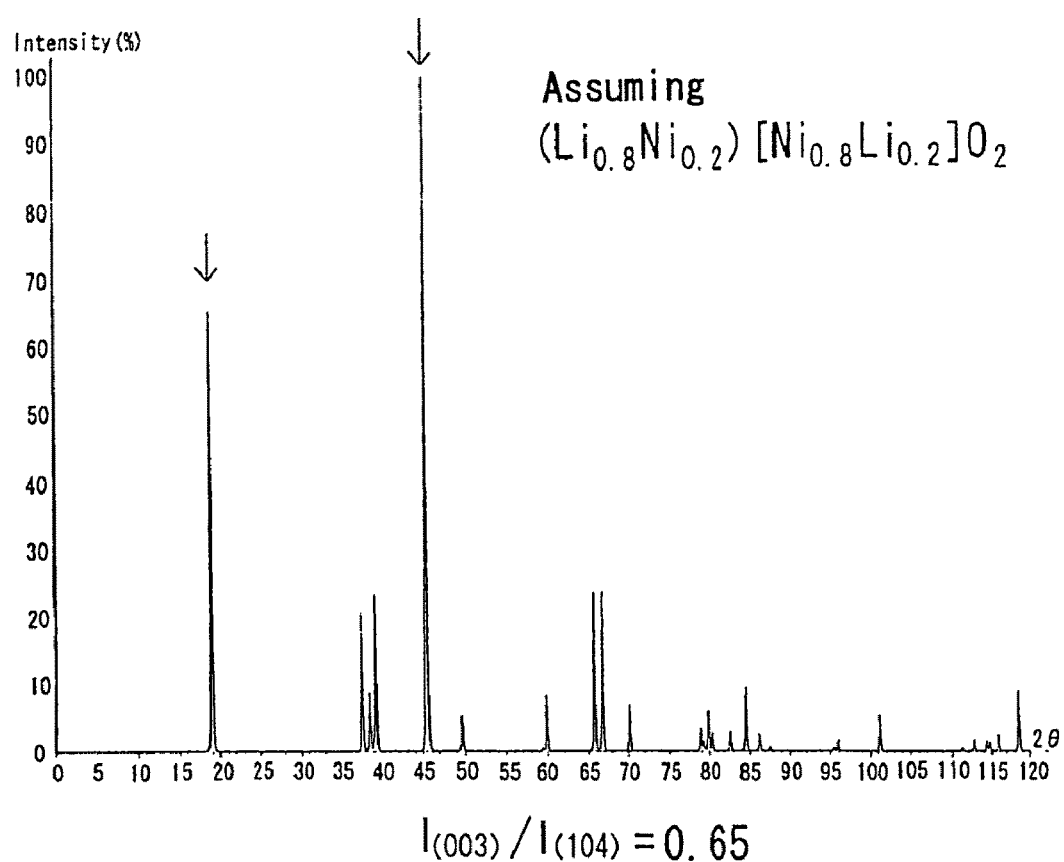
FIG. 4B: An X-ray diffraction pattern of an active material assumed to be (Li$_{0.8}$Ni$_{0.2}$)[Ni$_{0.8}$Li$_{0.2}$]O$_2$ (simulation result close to the description of a document).

As shown in FIG. 4A, $LiNiO_2$ has a intensity ratio $I_{(003)}/I_{(104)} = 1.10$ and the (003) diffraction peak is sufficiently high; however as shown in FIG. 4B, the intensity ratio of both is considerably changed to be $I_{(003)}/I_{(104)} \leqq 1$ since the disorder phase in which a transition metal (Co, Ni, Mn) is contaminated in the Li layer is formed.

In a conventional active material, it is supposed that such disorder phase is formed to inhibit smooth transfer of Li ion and it affects the reversible capacity.

On the other hand, in the active material of the present invention, it is supposed that since $I_{(003)}/I_{(104)} \geqq 1.56$, formation of the disorder phase is extremely slight and an excellent discharge capacity can be obtained.

The following can be assumed regarding the change of the intensity ratio $I_{(003)}/I_{(104)}$ of the diffraction peaks before charge-discharge and that of the diffraction peaks after charge-discharge after the active material production.

Even if the intensity ratio of the diffraction peaks before charge-discharge satisfies $I_{(003)}/I_{(104)} \geqq 1.56$, in a case where contamination of the transition metals in the Li layer occurs during discharge, the diffraction peak on (003) plane becomes broad and at the same time, the intensity ratio $I_{(003)}/I_{(104)}$ becomes significantly small and in a conventional active material, as shown in FIG. 5, transcription of a view described in Non-patent Document 6, the diffraction peak on (104) plane and its intensity may be sometimes reversed.

Figure 11:
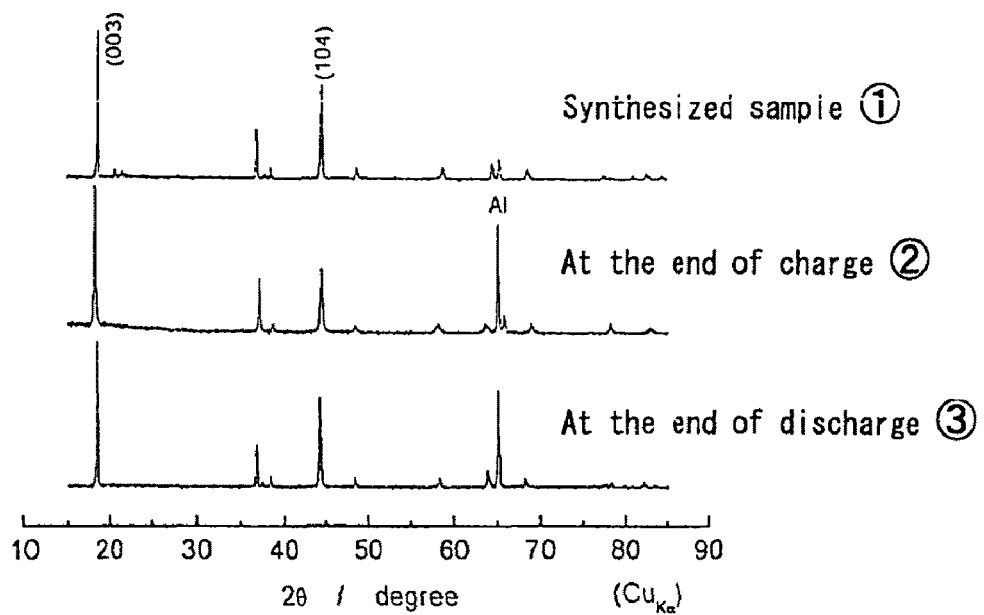
FIG. 11: X-ray diffraction patterns of the active material of Example 7 (AT18) before charge-discharge (synthesized sample), after charge, and after discharge.
Figure 12:
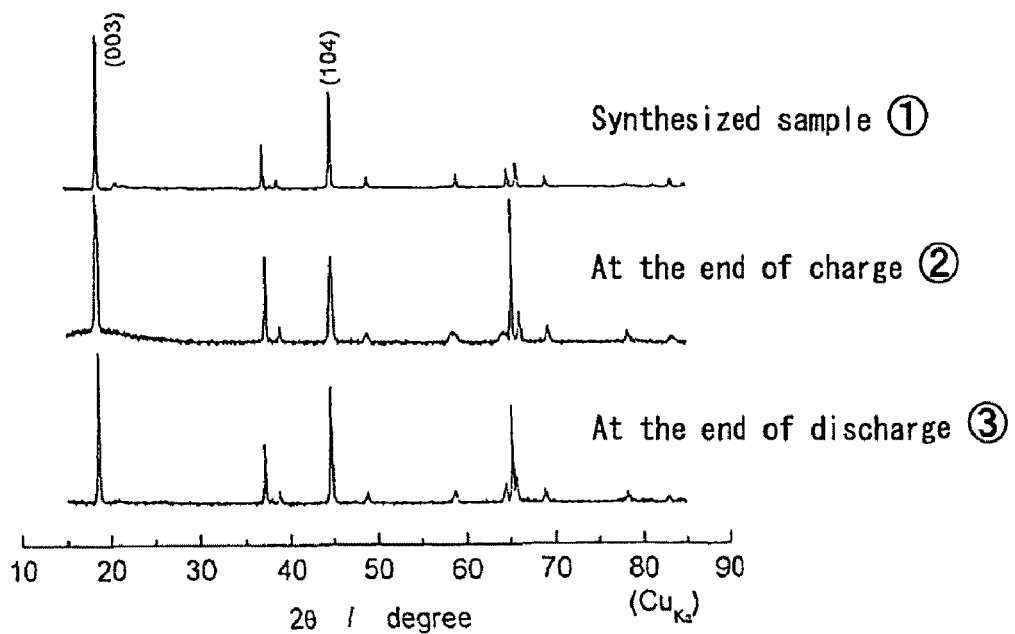
FIG. 12: X-ray diffraction patterns of the active material of Example 16 (AT33) before charge-discharge (synthesized sample), after charge, and after discharge.

On the other hand, with respect to the active material of the present invention, as shown in Table 1, FIG. 11 and FIG. 12, $I_{(003)}/I_{(104)} \geqq 1.56$ before charge-discharge and $I_{(003)}/I_{(104)} > 1$ ($I_{(003)}/I_{(104)} > 1.3$ in Examples) at the end of discharge and since the intensity of the diffraction peak on (003) plane does not reverse to that of the diffraction peak on (104) plane, it is indicated that contamination of the transition metals in the Li layer during charge-discharge does not occur and accordingly, it is supposed that a stable and high reversible capacity can be obtained. At the end of discharge, the intensity ratio $I_{(003)}/I_{(104)}$ may be higher than that before charge-discharge. In a case where the intensity ratio $I_{(003)}/I_{(104)}$ becomes smaller at the end of discharge than before charge-discharge, the change of the intensity ratio is preferably slight and it is more preferably within 30% of that before charge-discharge, and it is within 26% in Examples.

Next, a method for producing the active material for a lithium secondary battery of the present invention will be described.

Basically, the active material for a lithium secondary battery of the invention is obtained by preparing raw materials containing the metal elements (Li, Mn, Co, Ni) constituting the active material as those in the composition of the active material (oxide) of interest and calcining them. However, the amount of a Li raw material is preferable to be in excess by about 1 to 5% corresponding to the elimination of a portion of the Li raw material during calcining.

In order to produce the oxide in the composition of interest, methods known are a so-called "solid-state method" involving mixing and calcining respective salts of Li, Co, Ni, and Mn, and a "coprecipitation method" involving previously preparing a coprecipitated precursor in which Co, Ni, and Mn are made to be present in each single particle and then mixing and calcining a Li salt with the precursor. In the synthesis process by the "solid-state method", since Mn is particularly hard to uniformly form an solid solution with Co and Ni, it is difficult to obtain a sample of which the respective elements are uniformly distributed in each single particle. So far, many trials for forming a solid solution of Mn with a portion of Ni or Co by the solid-phase method have been performed and reported in documents (e.g. $LiNi_{1-x}Mn_xO_2$), it is easy to obtain a uniform phase in the atomic level by selecting the "coprecipitation method". Therefore, in Examples described below, the "coprecipitation method" is employed.

In order to produce a coprecipitated precursor, it is extremely important to make a solution from which the coprecipitated precursor is to be obtained inert atmosphere. It is because Mn tends to be oxidized among Co, Ni, and Mn and thus production of a coprecipitated hydroxide in which Co, Ni, and Mn are uniformly distributed in divalent state is not easy and consequently, uniform mixing of Co, Ni, and Mn in the atomic level tends to be insufficient. Particularly, in the composition range of the present invention, since the Mn ratio is high as compared with the Co and Ni ratios, it is moreover important to make the solution inert atmosphere. In Examples described below, bubbling of an inert gas is carried out in aqueous solutions to remove dissolved oxygen and further a reducing agent is simultaneously dropwise added.

A preparation method of the above-mentioned precursor to be subjected to calcining is not particularly limited. A Li compound, a Mn compound, a Ni compound, and a Co compound may be simply mixed, or a hydroxide containing the transition metal elements may be coprecipitated in a solution and then mixed with a Li compound. In order to produce a uniform composite oxide, a method of mixing a coprecipitated hydroxide of Mn, Ni, and Co and a Li compound and calcining the mixture is preferable.

Production of the above-mentioned coprecipitated hydroxide precursor is preferable to give a compound in which Mn, Ni, and Co are uniformly mixed. However, the precursor is not limited to the hydroxide but other than the hydroxide, any compound such as carbonate and citrate may be similarly employed, if the compounds are hardly soluble salts in which the elements are present uniformly in atomic level. Further, a crystallization reaction using a complexing agent may be employed to produce a precursor with a higher bulk density. At that time, since an active material with a high density and a small specific surface area can be obtained by mixing and calcining the precursor with a Li source, the energy density per electrode area can be improved.

Examples of raw materials for the above-mentioned coprecipitated hydroxide precursor include, as a Mn compound, manganese oxide, manganese carbonate, manganese sulfate, manganese nitrate, and manganese acetate; as a Ni compound, nickel hydroxide, nickel carbonate, nickel sulfate, nickel nitrate, and nickel acetate; and as a Co compound, cobalt sulfate, cobalt nitrate, and cobalt acetate.

As the raw materials to be used for the production of the above-mentioned coprecipitated hydroxide precursor, those in any state may be employed if they can cause precipitation reaction with an aqueous alkaline solution and preferably metal salts with high solubility.

The active material for a lithium secondary battery of the present invention can be produced preferably by mixing the coprecipitated hydroxide precursor with a Li compound and thereafter carrying out heat treatment for the mixture. Use of lithium hydroxide, lithium carbonate, lithium nitrate, or lithium acetate as the Li compound makes it possible to preferably carry out the production.

In the case of obtaining an active material with a high reversible capacity, selection of the calcining temperature is extremely important.

If the calcining temperature is too high, the obtained active material corrupts while being accompanied with oxygen releasing reaction and in addition to the hexagonal main phase, a phase defined as monoclinic $Li[Li_{1/3}Mn_{2/3}]O_2$ tends to be observed as a separate phase but not as a solid phase and such a material is undesirable since the reversible capacity of the active material is considerably decreased. With respect to such a material, impurity peaks are observed near 35° and 45° in the X-ray diffraction pattern. Accordingly, it is important that the calcining temperature is adjusted lower than the temperature which affects the oxygen releasing reaction of the active material. In the composition range of the present invention, the oxygen releasing temperature of the active material is around 1000° C. or higher; however, the oxygen releasing temperature slightly differs based on the composition of the active material and therefore it is preferable to previously confirm the oxygen releasing temperature of the active material. Particularly, it is confirmed that the oxygen releasing temperature of a precursor is shifted to the lower temperature side as the Co amount contained in a sample is higher and therefore, it should be considered carefully. As a method for confirming the oxygen releasing temperature of the active material, a mixture of a coprecipitated precursor and $LiOH.H_2O$ may be subjected to thermogravimetry (DTA-TG measurement) in order to simulate the calcining reaction process; however in this method, platinum employed for a sample chamber of a measurement instrument may be possibly corroded with an evaporated Li component to break the instrument and therefore, a composition of which crystallization is promoted to a certain extent by employing a calcining temperature of about 500° C. is preferable to be subjected to thermogravimetry.

On the other hand, if the calcining temperature is too low, the crystallization is not carried out sufficiently and the electrode property is also considerably lowered and it is thus not preferable. The calcining temperature is required to be at least 800° C. or higher. Sufficient crystallization is important to lower the resistance of grain boundaries and promote smooth lithium ion transfer. A method for careful evaluation of the crystallization may be visible observation using a scanning electron microscope. When the scanning electron microscopic observation is carried out for the positive active materials of the present invention, at the sample synthesis temperature of 800° C. or lower, there are those made of primary particles in nano-order and some are crystallized to a submicron extent by further increasing the sample synthesis temperature and large primary particles which lead to improvement of the electrode property can be obtained.

On the other hand, as another factor for showing crystallization, there is a half width of the X-ray diffraction peak described above. However, merely selection of the synthesis temperature at which the half width of the diffraction peak of the main phase is not necessarily adequate to obtain an active material with a high reversible capacity. It is because the half width of the diffraction peak is dominated by two factors; one is the quantity of strain showing the extent of mismatch of the crystal lattice and the other is the size of crystallite, which is the minimum domain and therefore, in order to carefully evaluate the extent of crystallinity from the half width, these factors need to be separately measured. The present inventors have confirmed that strains remain in the lattice in a sample which is synthesized at a temperature up to 800° C. by analysis in detail of the half width of the active material of the invention and synthesis of the temperature or higher makes it possible to fairly remove the strains. Further, the size of the crystallite becomes large in proportional to the increase of the synthesis temperature. Consequently, with respect to the composition of the active material of the invention, a desirable discharge capacity is obtained by forming particles sufficiently grown in the crystallite size with scarce strains in the lattice of the system. More concretely, it is found preferable to employ a synthesis temperature (a calcining temperature) at which the strain degree affecting the lattice constant is 1% or lower and the crystallite size is grown to 150 nm or larger. Although a change due to expansion and contraction is observed by molding the active materials into electrodes and carrying out charge-discharge, it is preferable to keep the crystallite size 130 nm or higher also in the charge-discharge process as a good effect to be obtained. That is, it is made at first possible to obtain an active material with a remarkably high reversible capacity by selecting the calcining temperature to be as near as possible to the oxygen releasing temperature of the active material.

As described above, although it is difficult to set a definitely preferable range of the calcining temperature since it differs depending on the oxygen releasing temperature of an active material, it is preferably 900 to 1100° C., more preferably 950 to 1050° C. since excellent properties can be exhibited.

An nonaqueous electrolyte to be used for the lithium secondary battery of the present invention is not particularly limited and those generally proposed for use for lithium batteries and the like can be used. Examples of nonaqueous solvents to be used for the nonaqueous electrolyte can include, but are not limited to, one compound or a mixture of two or more of compounds of cyclic carbonic acid esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethylmethyl carbonates; chain esters such as methyl formate, methyl acetate, and methyl butyrate; tetrahydrofuran and derivatives thereof, ethers such as 1,3-dioxane, 1,4-dioxane, 1,2-dimethoxyethane, 1,4-dibutoxyethane, and methyl diglyme; nitriles such as acetonitrile and benzonitrile; dioxolan and derivatives thereof, and ethylene sulfide, sulfolane, sulfone and derivatives thereof.

Examples of electrolytic salts to be used for the nonaqueous electrolyte include inorganic ionic salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN; and organic ionic salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearylsulfonate, lithium octylsulfonate, and lithium dodecylbenzenesulfonate and these ionic compounds may be used alone or in combination of two or more of them.

Further, if a lithium salt having a perfluoroalkyl group such as $LiBF_4$ and $LiN(C_2F_5SO_2)_2$ is added to be used, the viscosity of the electrolyte can be lowered and therefore the low temperature properties can be further improved and self-discharge can be suppressed and therefore, it is preferable.

Further, a normal temperature molten salt or ionic liquid may be used as the nonaqueous electrolyte.

The concentration of the electrolytic salt in the nonaqueous electrolyte is preferably 0.1 mold to 5 mold and more preferably 0.5 mol/l to 2 mol/l to reliably obtain a nonaqueous electrolyte battery having high battery properties.

A negative electrode material is not particularly limited and may be any if it can precipitate or absorb lithium ions. Examples thereof include a titanium type materials such as lithium titanate having a spinel type crystal structure typified by $Li[Li_{1/3}Ti_{5/3}]O_4$; alloy type lithium metal and lithium alloys of Si and Sb and Sn (lithium metal-containing alloy such as lithium-silicon, lithium-aluminum, lithium-lead, lithium-tin, lithium-aluminum-tin, lithium-gallium, and Wood' alloy), lithium composite oxide (lithium-titanium), silicon oxide as wells as alloys capable of absorbing and releasing lithium, and carbon materials (e.g. graphite, hard carbon, low temperature calcined carbon, amorphous carbon).

A powder of the positive active material and a powder of the negative active material preferably have an average particle size of 100 μm or smaller. Particularly, the powder of the positive active material is desirable to be 10 μm or smaller in order to improve the high output performance of the nonaqueous electrolyte battery. In order to obtain a powder in a prescribed shape, a pulverizer or a classifier may be used. For example, usable are mortars, ball mills, sand mills, vibration ball mills, planet ball mills, jet mills, counter jet mills, swirling current type jet mill, and sieves. At the time of pulverization, wet pulverization in co-presence of water or an organic solvent such as hexane can also be employed. A classification method is not particularly limited and sieves, pneumatic classifiers and the like may be employed in both dry and wet manner if necessary.

The positive active material and the negative active material, which are main constituent components of a positive electrode and a negative electrode are described in detail, and the positive electrode and the negative electrode may contain an electric conductive agent, a binder, a thickener, a filler and the like as other constituent components besides the above-mentioned main constituent components.

The electric conductive agent is not particularly limited if it is an electron conductive material causing no adverse effect on the battery performance and it may be, in general, electric conductive materials such as natural graphite (scaly graphite, flaky graphite, earthy graphite), artificial graphite, carbon black, acetylene black, Ketjen black, carbon whisker, carbon fibers, powders of metals (copper, nickel, aluminum, silver, gold, etc.), metal fibers and electric conductive ceramic materials, and one or a mixture of these materials may be used.

As an electric conductive agent among them, acetylene black is preferable form the viewpoints of electron conductivity and coatability. The addition amount of the electric conductive agent is preferably 0.1% by weight to 50% by weight and particularly preferably 0.5% by weight to 30% by weight based on the total weight of the positive electrode or the negative electrode. Particularly, if acetylene black is used while being pulverized into ultrafine particles of 0.1 to 0.5 μm, the carbon amount to be needed can be saved and therefore it is preferable. A mixing method of them may be physical mixing and ideally, it is uniform mixing. For this reason, powder mixers such as V-shaped mixers, S-shaped mixers, attriters, ball mills, and planet ball mills may be used to carry out dry or wet mixing.

As the binder, in general, thermoplastic resins such as polytetrafluoroethylene (PTFE), poly(vinylidene fluoride) (PVDF), polyethylene, and polypropylene; and polymers having rubber elasticity such as ethylene-propylene-diene-terpolymers (EPDM), sulfonated EPDM, styrene-butadiene rubber (SBR), fluoro rubber can be used alone or in combination of two or more of them. The addition amount of the binder is preferably 1 to 50% by weight and particularly preferably 2 to 30% by weight based on the total weight of the positive electrode or the negative electrode.

The filler is not particularly limited if it is a material causing no adverse effect on the battery performance. In general, usable may be olefin type polymers such as polypropylene and polyethylene; amorphous silica, alumina, zeolite, glass, carbon and the like. The addition amount of the filler is preferably 30% by weight or less based on the total weight of the positive electrode or the negative electrode.

The positive electrode and the negative electrode can be preferably produced by mixing the main constituent components (the positive active material in the positive electrode and the negative active material in the negative electrode) and other materials to obtain composites, then mixing the composites with an organic solvent such as N-methylpyrrolidone, toluene, or the like, applying the obtained mixed solutions onto current collectors described below or bonding the solution with pressure, and carrying out heat treatment at a temperature of about 50° C. or 250° C. for about 2 hours. The application method is preferably carried out to give an arbitrary thickness and an arbitrary shape by using means such as roller coating such as applicator rolls, screen coating, doctor blade coating manner, spin coating, and bar coaters; however it is not limited to thereto.

As a separator, porous membranes and nonwoven fabrics having excellent high rate discharge performance may be used preferably alone or in combination. Examples of materials constituting a separator for a nonaqueous electrolyte battery can include polyolefin type resins typified by polyethylene and polypropylene; polyester type resins typified by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

The porosity of the separator is preferable 98% by volume or less from the viewpoint of strength. Further, from the viewpoint of charge-discharge property, the porosity is preferably 20% by volume or higher.

The separator may be a polymer gel configured by, for example, a polymer of acrylonitrile, ethylene oxide, propylene oxide, methyl methacrylate, vinyl acetate, vinylpyrrolidone, and poly(vinylidene fluoride) and an electrolyte. If the nonaqueous electrolyte is used in a gel state as described above, it is preferable since it is effective to prevent liquid leakage.

Further, in the separator, the above-mentioned porous membranes or nonwoven fabrics are used in combination with the polymer gel, it is preferable since the electrolyte retention property is improved. That is, a film is obtained by coating the surface and fine pore wall surfaces of a polyethylene fine porous membrane with a solvophilic polymer in a thickness of several μm or less and making the fine pores of the film keep the electrolyte, so that the solvophilic polymer can be formed into gel.

Examples of the solvophilic polymer include poly(vinylidene fluoride) and also polymers crosslinked by acrylate monomers having ethylene oxide groups or ester groups, epoxy monomers, and monomers having isocyanato groups. Crosslinking reaction of the monomers may be carried out by heating or using ultraviolet rays (UV) with a radical initiator in combination or using activation beam such as electron beam.

The configuration of the lithium secondary battery is not particularly limited and examples thereof include cylindrical batteries, prismatic batteries, and flat type batteries including the positive electrode, negative electrode, and roll type separator.

EXAMPLES

Figure 1:
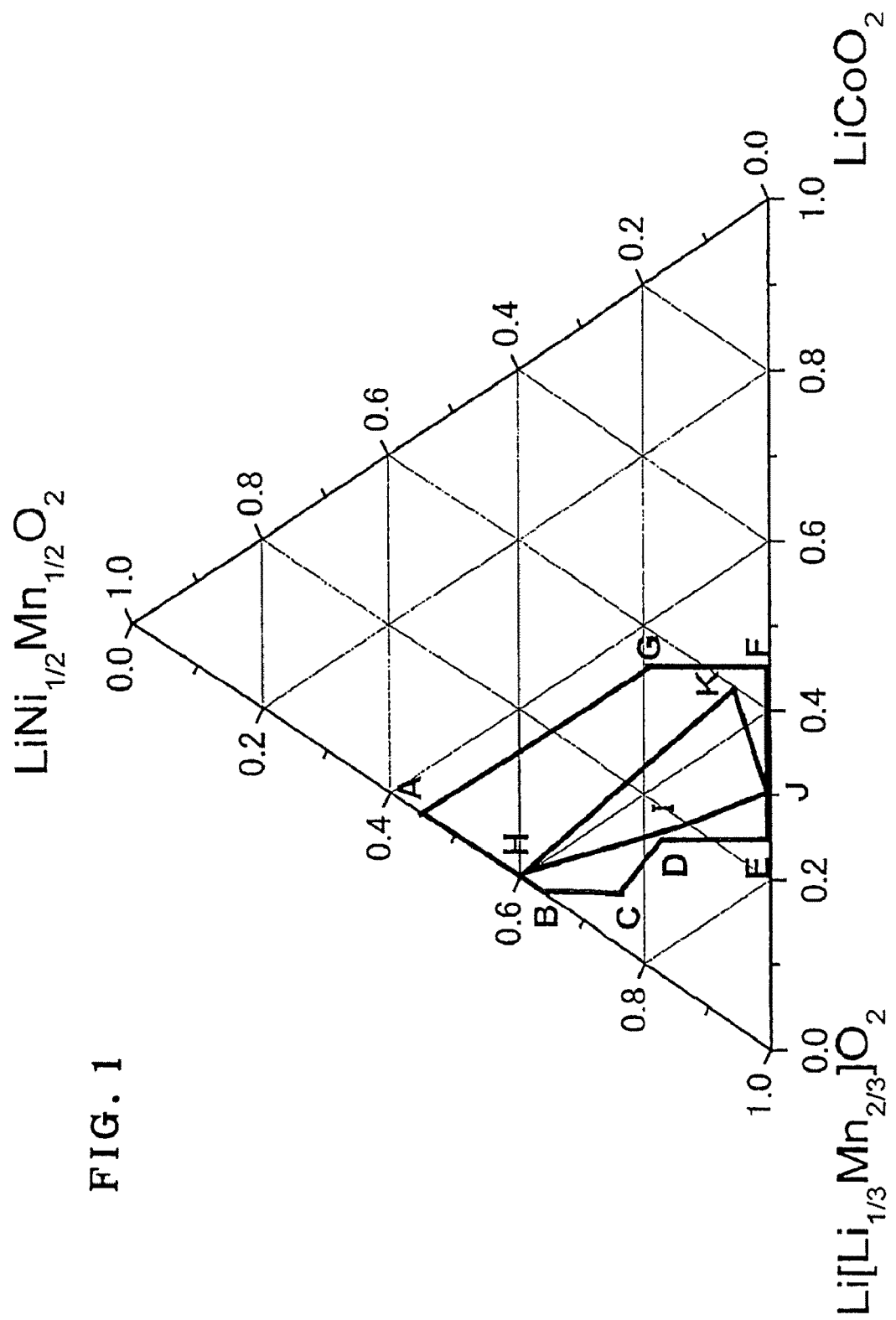
FIG. 1: A diagram showing the technical idea and the technical scope of the present invention.
Figure 2:
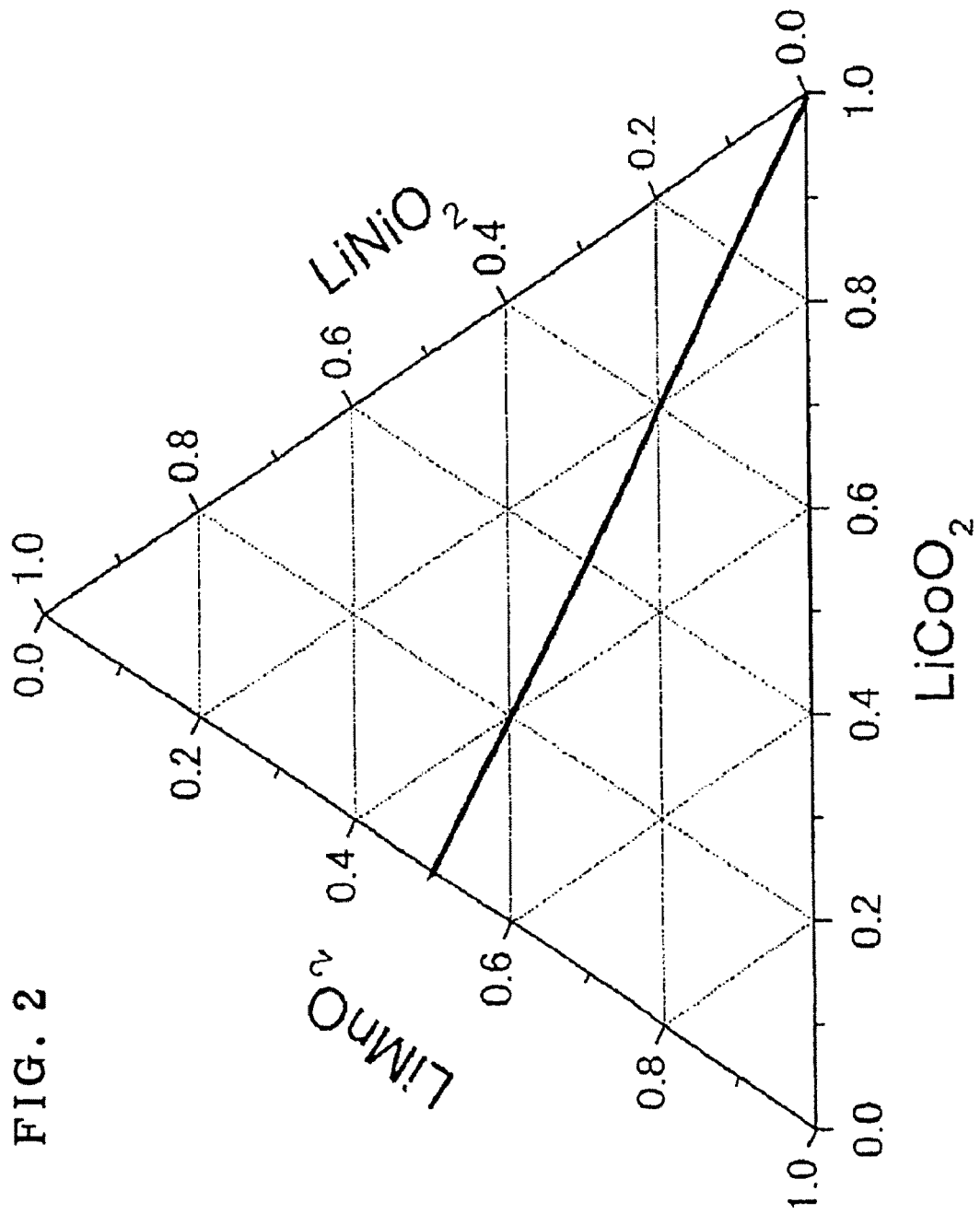
FIG. 2: A diagram for explaining the technical idea of a conventional technique.

The compositions of positive active materials used for lithium secondary batteries of Examples and Comparative Examples are shown in Table 1. The compositions of Examples 1 to 44 satisfy the composition formula: $Li_{1+(1/3)x}Co_{1-x-y}Ni_{(1/2)y}Mn_{(2/3)x+(1/2)y}$ (x+y≦1, 0≦y, 1−x−y=z) and also satisfy the range disclosed in claim 1: although Comparative Examples 1 to 40 satisfy the above-mentioned composition formula, the value of (x, y, z) is out of the range disclosed in claim 1: and Comparative Examples 41 to 43 do not satisfy even the composition formula. That is, in FIG. 1, the compositions of Examples 1 to 44 are present on or within a line of a heptagon ABCDEFG and the compositions of Comparative Examples 1 to 40 are present outside of the heptagon ABCDEFG.

Example 1

An aqueous mixed solution was produced by dissolving manganese sulfate pentahydrate, nickel sulfate hexahydrate, and cobalt sulfate heptahydrate at a ratio of 0.25:0.17:0.45 of the respective elements Co, Ni, and Mn in ion-exchanged water. At that time, the total concentration was adjusted to 0.667 M and the volume to 180 ml. Next, 600 ml of ion exchanged water was made available in a 1 L beaker and using a hot bath to keep the temperature at 50° C., 8N NaOH was dropwise added to adjust the pH 11.5. In such a state, bubbling with Ar gas was carried out for 30 min to sufficiently remove dissolved oxygen in the solution. The content in the beaker was stirred at 700 rpm, the prepared sulfates-mixed aqueous solution was added dropwise at a speed of 3 ml/min. During the time, the temperature was kept constant by the hot bath and pH was kept constant by intermittently adding 8 N NaOH dropwise. Simultaneously, 50 ml of an aqueous 2.0 M hydrazine solution as a reducing agent was added dropwise at a speed of 0.83 ml/min. On the completion of the dropwise addition of both, the stirring was stopped and the solution was kept still for 12 hours or longer to sufficiently grow particles of a coprecipitated hydroxide.

Herein, in the above-mentioned procedure, if the dropwise addition speed of each solution was too high, it became impossible to obtain a uniform precursor in atomic level. For example, in a case where the dropwise addition speed was increased 10 times as fast as that described above, the fact that the element distribution in the precursor was apparently ununiform was made clear from the results of EPMA measurement. Further, it was also confirmed that in a case where an active material was synthesize using such ununiform precursor, the distribution of elements after calcining also became ununiform and it resulted in impossibility of exhibiting sufficient electrode properties. In this connection, in the case of using $LiOH.H_2O$, $Co(OH)_2$, $Ni(OH)_2$, and MnOOH as raw material powders in a solid-phase method, further ununiformity was proved by the results of EPMA measurement.

Next, the coprecipitation product was taken out by suction filtration and dried at 100° C. in atmospheric air and normal pressure in an oven. After drying, in order to adjust particle diameter, the product was pulverized for several minutes by a mortar with a diameter of about 120 mmφ to obtain a dried powder.

By X-ray diffractometry, the dried powder was confirmed to have a $\beta$-$Ni(OH)_2$ type single phase. Further, Co, Ni, and Mn were confirmed to be present uniformly by EPMA measurement.

A lithium hydroxide monohydrate salt powder ($LiOH.H_2O$) was weighed to make the Li amount to the transition metals (Ni+Mn+Co) satisfy the composition formula of Example 1 in Table 1 and mixed to obtain a mixed powder.

Next, the mixed powder was pellet-molded at a pressure of 6 MPa. The amount of the precursor powder supplied to the pellet molding was determined by calculation for controlling the mass as a product after synthesis to be 3 g. As a result, the pellets after molding had a diameter of 25 mmφ, thickness about 10 to 12 mm. The pellets were put on an alumina boat with a whole length of about 100 mm, and then set in a box type electric furnace and calcined at 1000° C. for 12 hours in atmospheric air under normal pressure. The inside size of the boxy type electric furnace was 10 cm height, 20 cm width, and 30 cm depth and heating wires were set at 20 cm intervals in the width direction. After calcination, a switch of the heater was turned off and the alumina boat was left in the furnace as it was to carry out spontaneous cooling. As a result, the temperature of the furnace was lowered to about 200° C. after 5 hours; however the rate of the temperature decrease thereafter was slightly slow. After overnight, the temperature of the furnace was confirmed to be 100° C. or lower and thereafter the pellets were taken out and pulverized to make the particle diameter uniform by using a mortar.

Figure 6:
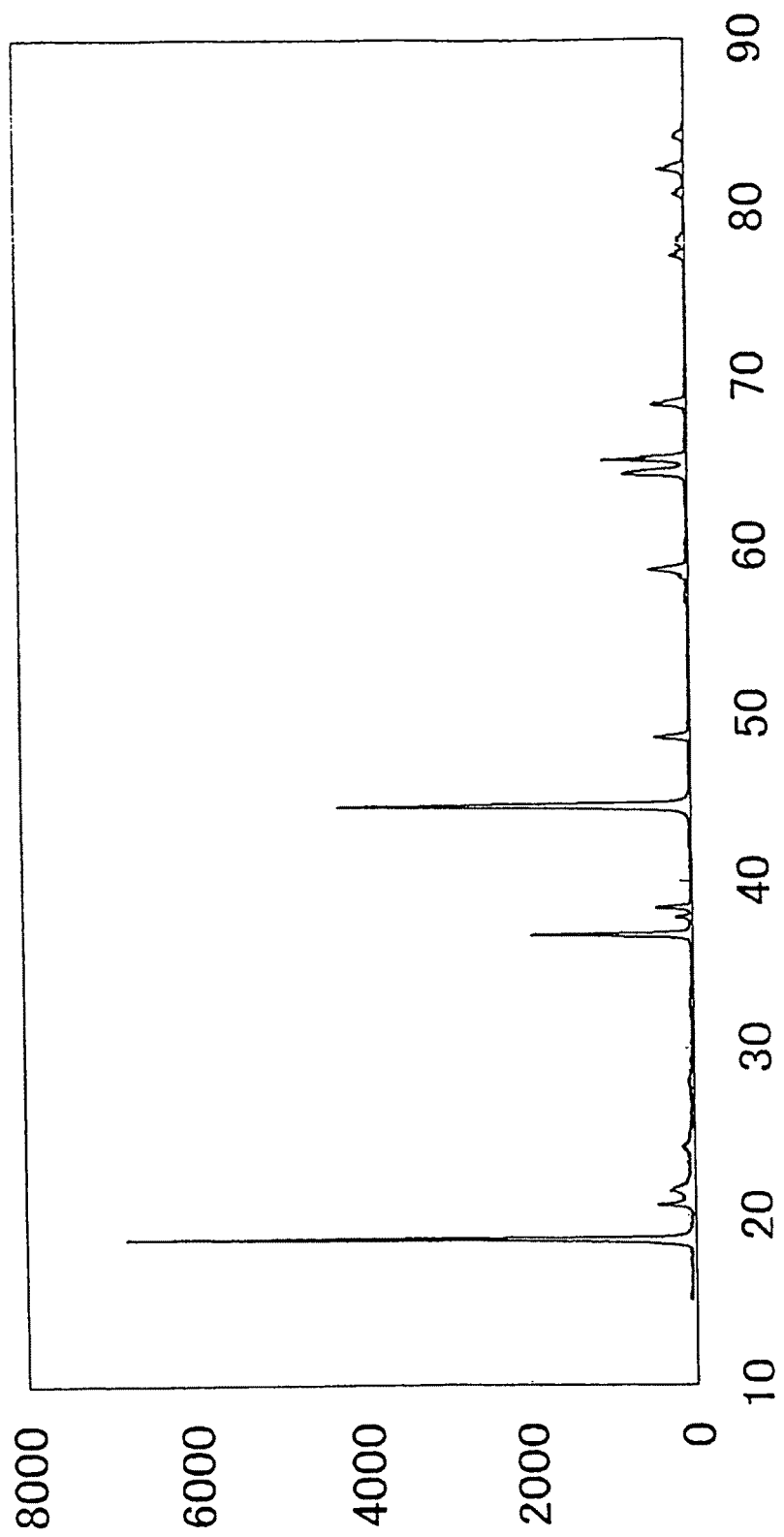
FIG. 6: An X-ray diffraction pattern of the active material of Example 1 (AT06).

The crystal structure of the obtained active material was confirmed to contain an α-$NaFeO_2$ type hexagonal structure as a main phase according to the results of powder X-ray diffractometry using a Cu(Kα) radiation and at the same time was observed to have a diffraction peak around 20 to 30° which is obtained Partially for a monoclinic Li[Li$_{1/3}$Mn$_{2/3}$]O$_2$. FIG. 6 shows the X-ray diffraction pattern of the active material (AT06) of Example 1. The intensity ratio I$_{(003)}$/I$_{(104)}$ between the diffraction peaks on (003) plane and (104) plane before charge-discharge was 1.69. Further, the count number of the diffraction peak at 21° which is observed for the monoclinic Li[Li$_{1/3}$Mn$_{2/3}$]O$_2$ was 7 in a case where the count number of the peaks near 18° showing the maximum intensity was assumed to be 100.

Further, XAFS measurement was carried out for valence evaluation of the transition metal elements. When the spectrometric analysis was carried out for the XANES region, it was confirmed that Co$^{3+}$, Ni$^{2+}$, and Mn$^{4+}$ were in electron state. The results of XANES measurement are shown in FIG. 7.

Examples 2 to 44

The active materials of the present invention were synthesize in the same manner as Example 1, except that the compositions of the transition metal elements contained in the coprecipitated hydroxide precursors and the amount of lithium hydroxide to be mixed was changed according to the composition formulas shown in Examples 2 to 44 shown in Table 1.

As a result of X-ray diffractometry, similarly to Example 1, the α-NaFeO$_2$ type hexagonal structure was confirmed to be a main phase and also a diffraction peak around 20 to 30° which is obtained partially for monoclinic Li[Li$_{1/3}$Mn$_{2/3}$]O$_2$ was observed. Further, as shown in Table 1, the intensity ratio I$_{(003)}$/I$_{(104)}$ between the diffraction peaks on (003) plane and (104) plane before charge-discharge was all 1.56 or higher.

Comparative Examples 1 to 40

The active materials of Comparative Examples were synthesize in the same manner as Example 1, except that the compositions of the transition metal elements contained in the coprecipitated hydroxide precursors and the amount of lithium hydroxide to be mixed was changed according to the composition formulas shown in Comparative Examples 1 to 40 shown in Table 1.

Figure 8:
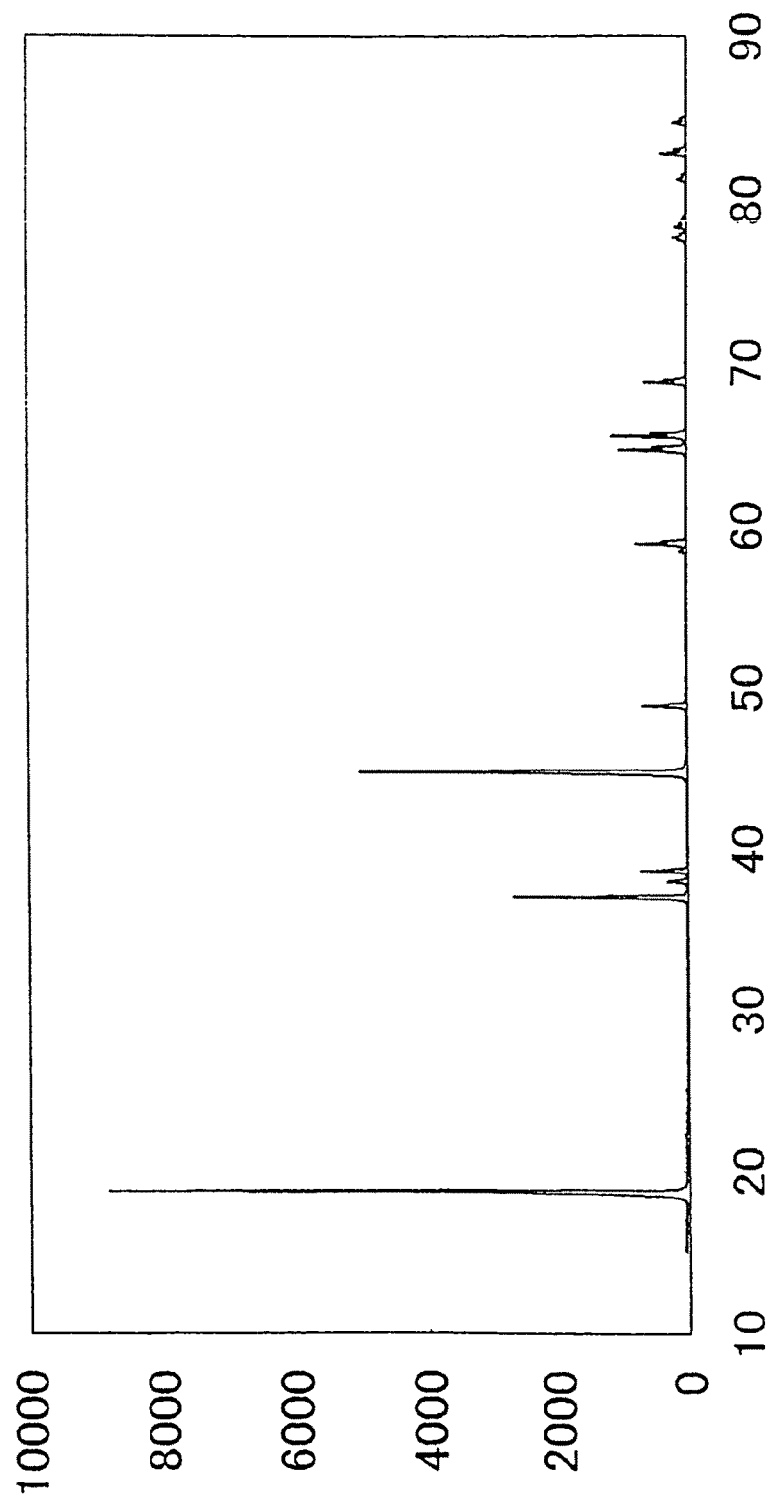
FIG. 8: An X-ray diffraction pattern of the active material of Comparative Example 3 (AT09).

FIG. 8 shows the X-ray diffraction pattern of the active material of Comparative Example 3 (AT09) as representative. With respect to Comparative Examples 12 to 18 and 33 to 40 in which the x value is ⅔ or more, similarly to Example 1, the α-NaFeO$_2$ type hexagonal structure was confirmed to be a main phase and also a diffraction peak around 20 to 30° which is obtained partially for monoclinic Li[Li$_{1/3}$Mn$_{2/3}$]O$_2$ was observed. However, with respect to Comparative Examples 1 to 11 and 19 to 32 in which the x value is ⅓ or less, although the α-NaFeO$_2$ type hexagonal structure was confirmed, no diffraction peak observed for monoclinic Li[Li$_{1/3}$Mn$_{2/3}$]O$_2$ was clearly observed as long as the peak height of the maximum intensity in the X-ray diffraction pattern was enlarged to the full scale. Further, as shown in Table 1, the intensity ratios I$_{(003)}$/I$_{(104)}$ between the diffraction peaks on (003) plane and (104) plane of the active materials before charge-discharge were 1.43 or higher, however some were 1.56 or lower.

Comparative Examples 41 and 42

The active materials of Comparative Examples 41 and 42 were synthesize in the same manner as Example 1, except that the compositions of the transition metal elements contained in the coprecipitated hydroxide precursors and the amount of lithium hydroxide to be mixed was changed according to the composition formula: LiCo$_{1/3}$Ni$_{1/3}$Mn$_{1/3}$O$_2$.

Herein, Comparative Examples 41 and 42 were different from each other in the set values of the charging voltage in the test condition described below (Comparative Example 41: 4.6 V, Comparative Example 42: 4.3 V) and were identical with each other as the active material.

Comparative Example 43

The active material of Comparative Example 43 was synthesize in the same manner as Example 1, except that a powder obtained by mixing respective powders of LiOH.H$_2$O, Co(OH)$_2$, Ni(OH)$_2$, and MnOOH at element ratio of Li:Co:Ni:Co=1:0.33:0.33:0.33 was used in place of the coprecipitated hydroxide precursor powder. The X-ray diffraction pattern could not be discriminated from those of Comparative Examples 1 and 42. However, from the results of EPMA observation, Co, Ni, and Mn were not uniformly distributed in the material.

(Production and Evaluation of Lithium Secondary Batteries)

Using the respective active materials of Examples 1 to 44 and Comparative Examples 1 to 43 as a positive active material for a lithium secondary battery, lithium secondary batteries were produced in the following procedure and the battery properties were evaluated.

Each coating solution was prepared by mixing each active material, acetylene black (AB), and poly(vinylidene fluoride) (PVdF) at a weight ratio of 85:8:7 and adding N-methylpyrrolidone as a dispersion medium and mixing and dispersing these compounds. As PVdF, a liquid in which solid matter was dissolved and dispersed was used and solid matter weight conversion was carried out. The coating solution was applied to an aluminum foil current collector with a thickness of 20 μm to produce each positive electrode plate. In all batteries, the electrode weight and thickness were standardized to make the same test conditions for all of the batteries.

As a counter electrode, lithium metal was used for a negative electrode to observe the behavior of each positive electrode alone. The lithium metal was closely attached to a nickel foil current collector. However, it was prepared in such a manner that the capacity of each lithium secondary battery was controlled sufficiently by the positive electrode.

As an electrolyte, a solution was used which was obtained by dissolving LiPF$_6$ in a solvent mixture of EC/EMC/DMC at a ratio of 6:7:7 by volume to give a concentration of 1 mol/L. As a separator, a finely porous film made of polypropylene was used which was provided with improved electrolyte retention property by surface modification with polyacrylate. Further, an electrode obtained by sticking a lithium metal foil to a nickel plate was used as a reference electrode. As an outer casing, a metal resin composite film was used which was made of poly(ethylene terephthalate) (15 μm)/aluminum foil (50 μm)/metal-adhesive polypropylene film (50 μm) and the electrodes were housed in such a manner that the opened terminal parts of the positive electrode terminal, negative electrode terminal, and reference electrode terminal were exposed to the outside and fusion-melting margins where the inner surfaces of the metal resin composite films were mutually encountered were tightly sealed except the portion where an injection hole was to be formed.

Each lithium secondary battery produced in the above-mentioned manner was subjected to the initial charge-discharge process of 5 cycles at 20° C. The voltage control was all carried out for the positive electrode potential. Charge was carried out at constant current and constant voltage charge for 0.1 ItA and 4.5 V and the condition of ending the charge was set to be the time point when the electric current value was decreased to 1/6. Discharge was carried out at constant current for 0.1 ItA and 2.0 V at the end. In all cycles, a 30 minute-rest was set after charge and after discharge. The behavior of the first two cycles in the initial charge-discharge process is shown in FIG. 9. FIG. 9A and FIG. 9B correspond to Example 6 (AT17) and Comparative Example 4 (AT11), respectively.

Successively, a charge-discharge cycle test was carried out. The voltage control was carried out all for the positive electrode potential. The conditions of the charge-discharge cycle test were the same as those in the above-mentioned initial charge-discharge process, except that the charge voltage was set to 4.3 V (vs. Li/Li$^+$) (4.6 V only for Comparative Example 41). In all cycles, a 30 minute-pause was set after charge and after discharge. The discharge electric quantity at 5th cycle was recorded as "discharge capacity (mAh/g)". FIG. 10 shows a representative charge-discharge curve of the 5th cycle in this charge-discharge cycle test.

Further, percentage of the discharge electric quantity at 10th cycle in the charge-discharge cycle test to the above-mentioned "discharge capacity (mAh/g)" was measured and defined as "capacity retention ratio (%)".

Similarly to the measurement before charge-discharge, after charge-discharge, the active materials of Examples 1 to 44 and Comparative Examples 1 to 40 were subjected to powder X-ray diffractometry using a Cu(Kα) radiation. Charge was constant current and constant voltage charge at 0.1 ItA current and 4.5 V voltage and the ending of the charge was set to be the time point when the electric current value was decreased to 1/6. Thereafter, charging was carried out to 4.3 V (vs. Li/Li$^+$) and then constant current discharge at 0.1 ItA current was carried out and the time point when the voltage at the end became 2.0 V was defined as the end of the discharge. The X-ray diffraction patterns of the active material of Example 7 (AT18) and the active material of Example 16 (AT33) before charge-discharge (synthesized samples), at end of charge, and at end of discharge are shown respectively in FIG. 11 and FIG. 12.

With respect to the active materials of Examples 1 to 44 and Comparative Examples 1 to 40, the results of the battery test (excluding the capacity retention ratio) are show in Table 1 and Table 2. FIG. 13 shows the values of the discharge capacities by plotting them in a Li[Li$_{1/3}$Mn$_{2/3}$]O$_2$(x)-LiNi$_{1/2}$Mn$_{1/2}$O$_2$(y)-LiCoO$_2$(z) type ternary phase diagram.

TABLE 1

| Example No. | Experiment No. | Before charge-discharge $I_{(0.03)}/I_{(104)}$ | At end of charge $I_{(0.03)}/I_{(104)}$ | Discharge capacity (mAh/g) | Li[Li$_{1/3}$Mn$_{2/3}$]O$_2$ (x) | LiNi$_{0.5}$Mn$_{0.5}$O$_2$ (y) | LiCoO$_2$ (z) |
|---|---|---|---|---|---|---|---|
| Example 1 | AT06 | 1.69 | 1.43 | 189 | 0.50 | 0.25 | 0.25 |
| Example 2 | AT14 | 1.77 | 1.68 | 186 | 0.45 | 0.20 | 0.35 |
| Example 3 | AT15 | 1.79 | 1.44 | 182 | 0.45 | 0.40 | 0.15 |
| Example 4 | AT16 | 1.65 | 1.39 | 180 | 0.45 | 0.50 | 0.05 |
| Example 5 | AT22 | 1.84 | 1.63 | 220 | 0.60 | 0.10 | 0.30 |
| Example 6 | AT17 | 1.77 | 1.67 | 225 | 0.60 | 0.20 | 0.20 |
| Example 7 | AT18 | 1.68 | 1.61 | 224 | 0.60 | 0.30 | 0.10 |
| Example 8 | AT19 | 1.61 | 1.43 | 219 | 0.60 | 0.40 | 0.00 |
| Example 9 | AT25 | 2.00 | 1.42 | 177 | 0.70 | 0.10 | 0.20 |
| Example 10 | AT27 | 1.64 | 1.60 | 180 | 0.67 | 0.23 | 0.10 |
| Example 11 | AT28 | 1.68 | 1.53 | 223 | 0.67 | 0.13 | 0.20 |
| Example 12 | AT29 | 1.78 | 1.50 | 207 | 0.67 | 0.03 | 0.30 |
| Example 13 | AT30 | 1.63 | 1.50 | 187 | 0.67 | 0.18 | 0.15 |
| Example 14 | AT31 | 1.62 | 1.56 | 185 | 0.67 | 0.00 | 0.33 |
| Example 15 | AT32 | 1.66 | 1.31 | 187 | 0.70 | 0.05 | 0.25 |
| Example 16 | AT33 | 1.78 | 1.31 | 198 | 0.70 | 0.00 | 0.30 |
| Example 17 | AT51 | 1.94 | 2.08 | 179 | 0.50 | 0.10 | 0.40 |
| Example 18 | AT53 | 2.07 | 2.18 | 183 | 0.60 | 0.00 | 0.40 |
| Example 19 | AT54 | 1.57 | 1.47 | 185 | 0.50 | 0.50 | 0.00 |
| Example 20 | AT55 | 1.91 | 1.75 | 185 | 0.50 | 0.40 | 0.10 |
| Example 21 | AT56 | 2.06 | 1.79 | 185 | 0.50 | 0.30 | 0.20 |
| Example 22 | AT57 | 2.13 | 2.40 | 185 | 0.50 | 0.20 | 0.30 |
| Example 23 | AT58 | 1.61 | 1.90 | 190 | 0.63 | 0.37 | 0.00 |
| Example 24 | AT59 | 1.66 | 1.46 | 191 | 0.63 | 0.32 | 0.05 |
| Example 25 | AT60 | 1.85 | 2.10 | 206 | 0.63 | 0.27 | 0.10 |
| Example 26 | AT61 | 1.93 | 1.81 | 200 | 0.63 | 0.22 | 0.15 |
| Example 27 | AT62 | 1.94 | 1.78 | 206 | 0.63 | 0.17 | 0.20 |
| Example 28 | AT63 | 2.17 | 1.79 | 200 | 0.63 | 0.07 | 0.30 |
| Example 29 | AT64 | 2.19 | 2.21 | 203 | 0.60 | 0.05 | 0.35 |
| Example 30 | AT65 | 2.16 | 1.61 | 200 | 0.67 | 0.08 | 0.25 |
| Example 31 | AT66 | 1.56 | 1.54 | 182 | 0.45 | 0.55 | 0.00 |
| Example 32 | AT67 | 1.83 | 1.99 | 177 | 0.45 | 0.30 | 0.25 |
| Example 33 | AT68 | 1.96 | 2.22 | 179 | 0.45 | 0.10 | 0.45 |
| Example 34 | AT69 | 2.11 | 2.27 | 186 | 0.50 | 0.15 | 0.35 |
| Example 35 | AT70 | 2.17 | 2.35 | 197 | 0.55 | 0.10 | 0.35 |
| Example 36 | AT71 | 2.22 | 2.06 | 199 | 0.55 | 0.05 | 0.40 |
| Example 37 | AT72 | 2.15 | 2.08 | 189 | 0.75 | 0.05 | 0.20 |
| Example 38 | AT73 | 1.81 | 1.59 | 180 | 0.75 | 0.00 | 0.25 |
| Example 39 | AT75 | 1.87 | 2.08 | 178 | 0.55 | 0.35 | 0.10 |
| Example 40 | AT76 | 2.02 | 1.97 | 185 | 0.55 | 0.25 | 0.20 |
| Example 41 | AT77 | 2.25 | 2.28 | 188 | 0.55 | 0.15 | 0.30 |
| Example 42 | AT78 | 2.08 | 2.44 | 183 | 0.55 | 0.00 | 0.45 |
| Example 43 | AT79 | 1.72 | 1.77 | 182 | 0.67 | 0.28 | 0.05 |
| Example 44 | AT81 | 1.67 | 1.70 | 190 | 0.70 | 0.25 | 0.05 |

TABLE 2

| Example No. | Experiment No. | Before charge-discharge $I_{(0.03)}/I_{(104)}$ | Discharge capacity (mAh/g) | Li[Li$_{1/3}$Mn$_{2/3}$]O$_2$ (x) | LiNi$_{0.5}$Mn$_{0.5}$O$_2$ (y) | LiCoO$_2$ (z) |
|---|---|---|---|---|---|---|
| Comparative Example 1 | AT04 | 1.65 | 158 | 0.33 | 0.33 | 0.33 |
| Comparative Example 2 | AT05 | 1.54 | 149 | 0.25 | 0.50 | 0.25 |
| Comparative Example 3 | AT09 | 1.56 | 148 | 0.15 | 0.60 | 0.25 |
| Comparative Example 4 | AT11 | 1.52 | 152 | 0.30 | 0.40 | 0.30 |
| Comparative Example 5 | AT20 | 2.07 | 143 | 0.15 | 0.20 | 0.65 |
| Comparative Example 6 | AT08 | 1.75 | 145 | 0.15 | 0.40 | 0.45 |
| Comparative Example 7 | AT10 | 1.89 | 145 | 0.15 | 0.80 | 0.05 |
| Comparative Example 8 | AT21 | 1.95 | 152 | 0.30 | 0.20 | 0.50 |
| Comparative Example 9 | AT12 | 1.83 | 154 | 0.30 | 0.60 | 0.10 |
| Comparative Example 10 | AT13 | 1.60 | 154 | 0.30 | 0.70 | 0.00 |
| Comparative Example 11 | AT07 | 1.76 | 145 | 0.25 | 0.25 | 0.50 |
| Comparative Example 12 | AT23 | 1.72 | 176 | 0.70 | 0.20 | 0.1n |
| Comparative Example 13 | AT24 | 1.70 | 147 | 0.80 | 0.10 | 0.10 |
| Comparative Example 14 | AT26 | 1.43 | 175 | 0.67 | 0.33 | 0.00 |
| Comparative Example 15 | AT34 | 1.75 | 166 | 0.80 | 0.05 | 0.15 |
| Comparative Example 16 | AT35 | 1.84 | 171 | 0.80 | 0.00 | 0.20 |
| Comparative Example 17 | AT36 | 1.61 | 164 | 0.90 | 0.05 | 0.05 |
| Comparative Example 18 | AT37 | 1.54 | 173 | 0.90 | 0.00 | 0.10 |
| Comparative Example 19 | AT38 | 1.61 | 172 | 0.33 | 0.60 | 0.07 |
| Comparative Example 20 | AT39 | 1.63 | 170 | 0.33 | 0.47 | 0.20 |
| Comparative Example 21 | AT40 | 1.96 | 157 | 0.33 | 0.20 | 0.47 |
| Comparative Example 22 | AT41 | 2.27 | 156 | 0.33 | 0.07 | 0.60 |
| Comparative Example 23 | AT42 | 2.62 | 141 | 0.30 | 0.10 | 0.60 |
| Comparative Example 24 | AT43 | 2.12 | 130 | 0.30 | 0.00 | 0.70 |
| Comparative Example 25 | AT44 | 2.50 | 159 | 0.40 | 0.10 | 0.50 |
| Comparative Example 26 | AT45 | 2.46 | 156 | 0.40 | 0.00 | 0.60 |
| Comparative Example 27 | AT46 | 1.55 | 167 | 0.40 | 0.60 | 0.00 |
| Comparative Example 28 | AT47 | 1.72 | 162 | 0.40 | 0.50 | 0.10 |
| Comparative Example 29 | AT48 | 1.69 | 158 | 0.40 | 0.40 | 0.20 |
| Comparative Example 30 | AT49 | 1.73 | 170 | 0.40 | 0.30 | 0.30 |
| Comparative Example 31 | AT50 | 2.33 | 152 | 0.40 | 0.20 | 0.40 |
| Comparative Example 32 | AT52 | 2.09 | 173 | 0.50 | 0.00 | 0.50 |
| Comparative Example 33 | AT80 | 1.61 | 139 | 0.70. | 0.30 | 0.00 |
| Comparative Example 34 | AT82 | 2.02 | 172 | 0.70 | 0.15 | 0.15 |
| Comparative Example 35 | AT83 | 1.67 | 147 | 0.75 | 0.25 | 0.00 |
| Comparative Example 36 | AT84 | 1.76 | 172 | 0.75 | 0.20 | 0.05 |
| Comparative Example 37 | AT85 | 2.12 | 160 | 0.75 | 0.15 | 0.10 |
| Comparative Example 38 | AT86 | 2.11 | 155 | 0.75 | 0.10 | 0.15 |

TABLE 2-continued

| Example No. | Experiment No. | Before charge-discharge $I_{(0.03)}/I_{(104)}$ | Discharge capacity (mAh/g) | Li[Li$_{1/3}$Mn$_{2/3}$]O$_2$ (x) | LiNi$_{0.5}$Mn$_{0.5}$O$_2$ (y) | LiCoO$_2$ (z) |
|---|---|---|---|---|---|---|
| Comparative Example 39 | AT87 | 1.67 | 147 | 0.80 | 0.20 | 0.00 |
| Comparative Example 40 | AT88 | 1.71 | 149 | 0.80 | 0.15 | 0.05 |

As being understood from Table 1, Table 2, and FIG. 13, use of the active materials of Examples 1 to 44 having values of (x, y, z) in a range present on or within a line of a heptagon (ABCDEFG) defined by the vertexes; point A(0.45, 0.55, 0: corresponding to the composition of AT66), point B(0.63, 0.37, 0: corresponding to the composition of AT58), point C(0.7, 0.25, 0.05: corresponding to the composition of AT81), point D(0.67, 0.18, 0.15: corresponding to the composition of AT30), point E(0.75, 0, 0.25: corresponding to the composition of AT73), point F(0.55, 0, 0.45: corresponding to the composition of AT78), and point G(0.45, 0.2, 0.35: corresponding to the composition of AT14) made it possible to obtain lithium secondary batteries with discharge capacities as high as 177 mAh/g or higher in a potential region of 4.3 V or lower. Those using the active materials of Comparative Examples 1 to 40 out of the above-mentioned range had discharge capacities of 176 mAh/g or lower. Especially, in the case of using active materials having particularly specified values (x, y, z) in a range present on or within a line of a tetragon (HIJK) defined by the vertexes; point H(0.6, 0.4, 0: corresponding to the composition of AT19), point I(0.67, 0.13, 0.2: corresponding to the composition of AT28), point J(0.7, 0, 0.3; corresponding to the composition of AT33), and point K(0.55, 0.05, 0.4: corresponding to the composition of AT71) (Examples 5 to 8, Examples 11, 12, 16, 25 to 30, and 36), lithium secondary batteries with discharge capacities as high as 198 mAh/g or higher in a potential region of 4.3 V or lower could be obtained.

Further, with respect to LiCo$_{1/3}$Ni$_{1/3}$Mn$_{1/3}$O$_2$, in a case where the discharge potential was adjusted to 4.6 V as in Comparative Example 41, the discharge capacity was 181 mAh/g; however, in a case where the discharge potential was adjusted to 4.3 V as in Comparative Example 42, the discharge capacity was 149 mAh/g and therefore, the value of the discharge capacity of the active material of the present invention exceeds that of Li[Co$_{1-2x}$Ni$_x$Mn$_x$]O$_2$ ($0 \leq x \leq \frac{1}{2}$) or LiNiO$_2$ type, which is regarded as representative of high capacity.

As shown in Table 1, the active material of the present invention had the intensity ratio of the diffraction peaks satisfying $I_{(003)}/I_{(104)} \geq 1.56$ before charge-discharge and $I_{(003)}/I_{(104)} > 1.3$ exceeding $I_{(003)}/I_{(104)} > 1$ at the end of discharge and moreover, since the change of the intensity ratio at the end of discharge was within 26% of that before charge-discharge, it is indicated that no contamination of the transition metals to the Li layer during charge-discharge was generated and at this point, the active material is apparently distinguished from the conventional Li[Li$_{1/3}$Mn$_{2/3}$]O$_2$(x)-LiNi$_{1/2}$Mn$_{1/2}$O$_2$(y)-LiCoO$_2$(z) type active material.

Furthermore, with respect to the capacity retention, the lithium secondary batteries using the active materials of Examples 1 to 44 kept 100%, whereas the lithium secondary batteries using the active materials of Comparative Examples 41, 42, and 43 kept only 89%, 98%, and 80%, respectively, and therefore, the lithium secondary battery of the present invention is found excellent also in the charge/discharge cycle performance.

The invention claimed is:

1. A process for producing a lithium secondary battery, comprising:
preparing the lithium secondary battery including a positive electrode having an active material comprising a solid solution of a lithium transition metal composite oxide having an α-NaFeO$_2$ crystal structure;
wherein a composition ratio of Li, Co, Ni, and Mn contained in the solid solution satisfies Li$_{1+(1/3)x}$Co$_{1-x-y}$Ni$_{(1//2)y}$Mn$_{(2//3)x+(1/2)y}$ wherein x+y$\leq$1, 0$\leq$y and 1−x−y=z;
in an Li[Li$_{1/3}$Mn$_{2/3}$]O$_2$(x)-LiNi$_{1/2}$Mn$_{1/2}$O$_2$(y)-LiCoO$_2$(z) ternary phase diagram, the active material is used where (x, y, z) is represented by values in a range present on or within a line of a heptagon (ABCDEFG) defined by the vertexes; point A(0.45, 0.55, 0), point B(0.63, 0.37, 0), point C(0.7, 0.25, 0.05), point D(0.67, 0.18, 0.15), point E(0.75, 0, 0.25), point F(0.55, 0, 0.45), and point G(0.45, 0.2, 0.35); and
an intensity ratio between diffraction peaks on (003) plane and (104) plane measured by X-ray diffractometry before charge-discharge is $2.25 \geq I_{(003)}/I_{(104)} \geq 1.56$, and
charging the positive electrode of the lithium secondary battery in an initial charge-discharge process after preparing the lithium secondary battery and before an actual usage, the positive electrode of the lithium secondary battery being charged in said initial charge-discharge process to reach at least a region with relatively flat fluctuation of potential appearing relative to a charging electric amount in a positive electrode potential region, and exceeding 4.3V (vs. Li/Li$^+$) but lower than 4.8V (vs. Li/Li$^+$) or lower,
wherein in charging the battery in the actual usage after said initial charge-discharge process, the positive electrode of the lithium secondary battery is always charged at a maximum achieved potential of 4.3V (vs. Li/Li$^+$) or lower.

2. The process for producing a lithium secondary battery according to claim 1, wherein the lithium secondary battery has a dischargeable electric quantity of 177 mAh/g or higher in a potential region of 4.3V (vs. Li/Li$^+$) or lower.

3. The process for producing a lithium secondary battery according to claim 1, wherein the active material, (x, y, z) is represented by values in a range present on or within a line of a tetragon (HIJK) defined by the vertexes; point H(0.6, 0.4, 0), point I (0.67, 0.13, 0.2), point J (0.7, 0, 0.3), and point K (0.55, 0.05, 0.4).

4. The process for producing a lithium secondary battery according to claim 3, wherein the lithium secondary battery has a dischargeable electric quantity of 200 mAh/g or higher in a potential region of 4.3V (vs. Li/Li$^+$) or lower.

5. The process for producing a lithium secondary battery according to claim 1, wherein the solid solution of the lithium transition metal composite oxide has a diffraction peak observed near 20 to 30° in X-ray diffractometry using CuKα radiation for monoclinic Li[Li$_{1/3}$Mn$_{2/3}$]O$_2$ before charge-discharge, and intensity of the diffraction peak is about 4 to 7% of intensity of the diffraction peak of (003) plane.

6. The process for producing a lithium secondary battery according to claim 1, wherein in the solid solution of the lithium transition metal composite oxide, an intensity ratio between diffraction peaks on (003) plane and (104) plane measured by X-ray diffractometry before charge-discharge is I$_{(003)}$/I$_{(104)}$≧1.56 and at the end of discharge it is I$_{(003)}$/I$_{(104)}$>1.

7. The process for producing a lithium secondary battery according to claim 1, wherein the solid solution of the lithium transition metal composite oxide has valances of respective metal elements as Li$^+$, Co$^{3+}$, Ni$^{2+}$, and Mn$^{4+}$.

8. The process for producing a lithium secondary battery according to claim 1, further comprising preparing the solid solution of the lithium transition metal composite oxide by a coprecipitation method.

9. The process for producing a lithium secondary battery according to claim 8, wherein the process of preparing the solid solution of the lithium transition metal composite oxide, comprises:
coprecipitating a Co compound, a Mn compound, and a Ni compound in a solution to make a precursor; and
mixing and calcining the precursor and a Li compound.

10. A process for producing a lithium secondary battery, comprising:
preparing the lithium secondary battery including a positive electrode formed of an active material comprising a solid solution of a lithium transition metal composite oxide having an α-NaFeO$_2$ crystal structure;
wherein a composition ratio of Li, Co, Ni, and Mn contained in the solid solution satisfies Li$_{1+(1/3)x}$Co$_{1-x-y}$Ni$_{(1//2)y}$Mn$_{(2//3)x+(1/2)y}$, wherein x+y≦1, 0≦y and 1−x−y=z; and
in an Li[Li$_{1/3}$Mn$_{2/3}$]O$_2$(x)-LiNi$_{1/2}$Mn$_{1/2}$O$_2$(y)-LiCoO$_2$(z) ternary phase diagram, the active material is used where (x, y, z) is represented by values in a range present on or within a line of a heptagon (ABCDEFG) defined by the vertexes; point A(0.45, 0.55, 0), point B(0.63, 0.37, 0), point C(0.7, 0.25, 0.05), point D(0.67, 0.18, 0.15), point E(0.75, 0, 0.25), point F(0.55, 0, 0.45), and point G(0.45, 0.2, 0.35), and an intensity ratio between diffraction peaks on (003) plane and (104) plane measured by X-ray diffractometry before charge-discharge is 2.25≧l$_{(003)}$/l$_{(104)}$≧1.56, and
charging the positive electrode of the lithium secondary battery in an initial charge-discharge process after preparing the lithium secondary battery and before an actual usage, the positive electrode of the lithium secondary battery being charged in said initial charge-discharge process to reach at least a region with relatively flat fluctuation of potential appearing relative to a charging electric amount in a positive electrode potential region, and exceeding 4.3V (vs. Li/Li$^+$) but lower than 4.8V (vs. Li/Li+),
wherein in charging the battery in the actual usage after said initial charge-discharge process, the positive electrode of the lithium secondary battery is always charged at a maximum achieved potential of 4.3V (vs. Li/Li$^+$) or lower, and a discharge capacity of the battery in charging the battery at said maximum achieved potential of 4.3V or lower is 177 mAh/g or higher.

* * * * *